(12) United States Patent
Barron et al.

(10) Patent No.: US 6,533,366 B1
(45) Date of Patent: *Mar. 18, 2003

(54) VEHICLE HYDRAULIC BRAKING SYSTEMS INCORPORATING MICRO-MACHINED TECHNOLOGY

(75) Inventors: Richard J. Barron, Ann Arbor, MI (US); Edward N. Fuller, Manchester, MI (US); Gerald M. Sivulka, Ann Arbor, MI (US); Gregory P. Campau, Plymouth, MI (US); Charles Darnell, Ypsilanti, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/496,104

(22) Filed: Feb. 1, 2000

Related U.S. Application Data

(63) Continuation-in-part of application No. 08/865,466, filed on May 29, 1997, now Pat. No. 6,019,437.
(60) Provisional application No. 60/018,607, filed on May 29, 1996.

(51) Int. Cl.⁷ .......................... B60T 8/31; H01L 37/00; E16K 31/18
(52) U.S. Cl. ...................... 303/113.1; 310/307; 251/11
(58) Field of Search ................... 188/156, 158, 188/162; 303/3, 15, 20, 113.4, 155, 158, DIG. 3; 137/1; 251/11; 310/307

(56) References Cited

U.S. PATENT DOCUMENTS

| | | |
|---|---|---|
| 4,434,813 A | 3/1984 | Mon |
| 4,581,624 A | 4/1986 | O'Connor |
| 4,628,576 A | 12/1986 | Giachino et al. |
| 4,647,013 A | 3/1987 | Giachino et al. |
| 4,821,997 A | 4/1989 | Zdeblick |
| 4,824,073 A | 4/1989 | Zdeblick |
| 4,826,131 A | 5/1989 | Mikkor |
| 4,828,184 A | 5/1989 | Gardner et al. |
| 4,869,282 A | 9/1989 | Sittler et al. |
| 4,938,742 A | 7/1990 | Smits |
| 4,943,032 A | 7/1990 | Zdeblick |

(List continued on next page.)

FOREIGN PATENT DOCUMENTS

| | | |
|---|---|---|
| DE | 4101575 | 7/1992 |
| DE | 4417251 | 11/1995 |
| DE | 4422942 | 1/1996 |
| EP | 0250948 | 1/1988 |
| EP | 0261972 | 3/1988 |
| WO | WO 99/16096 | 4/1999 |
| WO | WO 00/14415 | 3/2000 |

OTHER PUBLICATIONS

Noworolski et al., "Process for in–plane and out–of–plane single–crystal–silicon thermal microactuators," Sensor and Actuators A, Elsevier Science S.A., vol. 55, No. 1, (1996) 65–69.

(List continued on next page.)

Primary Examiner—Christopher P. Schwartz
(74) Attorney, Agent, or Firm—MacMillan, Sobanski & Todd, LLC

(57) ABSTRACT

Hydraulic or electro-hydraulic braking systems which include at least one wheel braking device and micromachined technology, such as microvalves, are described herein. The use of the microvalves helps to eliminate audible noise produced in the hydraulic systems as well as allows for reduced package size of the system. In particular, many of the braking systems described herein have Anti-lock Braking System (ABS) capabilities, and as such employ apply microvalves, dump microvalves and changeover microvalves. The microvalves may be digitally or proportionally controlled for selectively controlling the pressure supplied to the wheel brake cylinders.

18 Claims, 16 Drawing Sheets

U.S. PATENT DOCUMENTS

| | | |
|---|---|---|
| 4,959,581 A | 9/1990 | Dantlgraber |
| 4,966,646 A | 10/1990 | Zdeblick |
| 5,029,805 A | 7/1991 | Albarda et al. |
| 5,050,838 A | 9/1991 | Beatty et al. |
| 5,054,522 A | 10/1991 | Kowanz et al. |
| 5,058,856 A | 10/1991 | Gordon et al. |
| 5,061,914 A | 10/1991 | Busch et al. |
| 5,064,165 A | 11/1991 | Jerman |
| 5,065,978 A | 11/1991 | Albarda et al. |
| 5,069,419 A | 12/1991 | Jerman |
| 5,074,629 A | 12/1991 | Zdeblick |
| 5,082,242 A | 1/1992 | Bonne et al. |
| 5,096,643 A | 3/1992 | Kowanz et al. |
| 5,131,729 A | 7/1992 | Wetzel |
| 5,133,379 A | 7/1992 | Jacobsen et al. |
| 5,142,781 A | 9/1992 | Mettner et al. |
| 5,161,774 A | 11/1992 | Engelsdorf et al. |
| 5,177,579 A | 1/1993 | Jerman |
| 5,178,190 A | 1/1993 | Mettner |
| 5,179,499 A | 1/1993 | Macdonald et al. |
| 5,180,623 A | 1/1993 | Ohnstein |
| 5,197,517 A | 3/1993 | Perera |
| 5,209,118 A | 5/1993 | Jerman |
| 5,216,273 A | 6/1993 | Doering et al. |
| 5,217,283 A * | 6/1993 | Watanabe ............... 303/113.2 |
| 5,238,223 A | 8/1993 | Mettner et al. |
| 5,244,537 A | 9/1993 | Ohnstein |
| 5,267,589 A | 12/1993 | Watanabe |
| 5,271,431 A | 12/1993 | Mettner et al. |
| 5,271,597 A | 12/1993 | Jerman |
| 5,309,943 A | 5/1994 | Stevenson et al. |
| 5,325,880 A | 7/1994 | Johnson et al. |
| 5,333,831 A | 8/1994 | Barth et al. |
| 5,355,712 A | 10/1994 | Petersen et al. |
| 5,368,704 A | 11/1994 | Madou et al. |
| 5,375,919 A | 12/1994 | Furuhashi |
| 5,400,824 A | 3/1995 | Gschwendtner et al. |
| 5,417,235 A | 5/1995 | Wise et al. |
| 5,445,185 A | 8/1995 | Watanabe et al. |
| 5,458,405 A | 10/1995 | Watanabe |
| 5,566,703 A | 10/1996 | Watanabe et al. |
| 5,785,295 A | 7/1998 | Tsai |
| 5,882,090 A * | 3/1999 | Ganzel ..................... 303/113.2 |
| 5,909,078 A | 6/1999 | Wood et al. |
| 5,941,608 A * | 8/1999 | Campau et al. .......... 303/113.4 |
| 5,954,079 A | 9/1999 | Barth et al. |
| 5,955,817 A | 9/1999 | Dhuler et al. |
| 5,970,998 A | 10/1999 | Talbot et al. |
| 5,994,816 A | 11/1999 | Dhuler et al. |
| 6,023,121 A | 2/2000 | Dhuler et al. |
| 6,038,928 A | 3/2000 | Maluf et al. |
| 6,105,737 A * | 8/2000 | Weigert et al. ............. 188/158 |
| 6,114,794 A | 9/2000 | Dhuler et al. |

OTHER PUBLICATIONS

IEEE Technical Digest entitled "Compliant Electro–Microactuators", J. Jonsmann, O. Sigmund, S. Bouwstra, Twelfth IEEE International Conference on Micro Electro Mechanical Systems held Jan. 17–21, 1999, Orlando, Florida, pp. 588–593, IEEE Catalog No.: 99CH36291C.

"A Silicon Microvalve For The Proportional Control Of Fluids" by K.R. Williams, N.I. Maluf, E.N. Fuller, R.J. Barron, D.P. Jaeggi, and B.P. van Drieënhuizen, TRANSDUCERS '99, Proc. $10^{th}$ International Conference on Solid State Sensors and Actuators, held Jun. 7–10, 1999, Sendai, Japan, pp. 18–21.

Ayón et al., "Etching Characteristics and Profile Control in a Time Multiplexed ICP Etcher," Proc. Of Solid State Sensor and Actuator Workshop Technical Digest, Hilton Head SC, (Jun. 1998) 41–44.

Bartha et al., "Low Temperature Etching of Si in High Density Plasma Using $SF_6/O_2$," Microelectronic Engineering, Elsevier Science B.V., vol. 27, (1995) 453–456.

Fung et al., "Deep Etching of Silicon Using Plasma" Proc. Of the Workshop on Micromachining and Micropackaging of Transducers, (Nov. 7–8, 1984) 159–164.

Klaassen et al., "Silicon Fusion Bonding and Deep Reactive Ion Etching; A New Technology for Microstructures," Proc. Transducers 95 Stockholm Sweden, (1995) 556–559.

Linder et al., "Deep Dry Etching Techniques as a New IC Compatible Tool for Silicon Micromachining," Proc,. Transducers, vol. 91, (Jun. 1991) 524–527.

Petersen et al., "Surfaced Micromachined Structures Fabricated with Silicon Fusion Bonding," Proc. Transducers, vol. 91, (Jun. 92) 397–399.

Yunkin et al., "Highly Anisotropic Selective Reactive Ion Etching of Deep Trenches in Silicon," Microelectronic Enginineering, Elsevier Science B.V., vol. 23, (1994) 373–376.

* cited by examiner

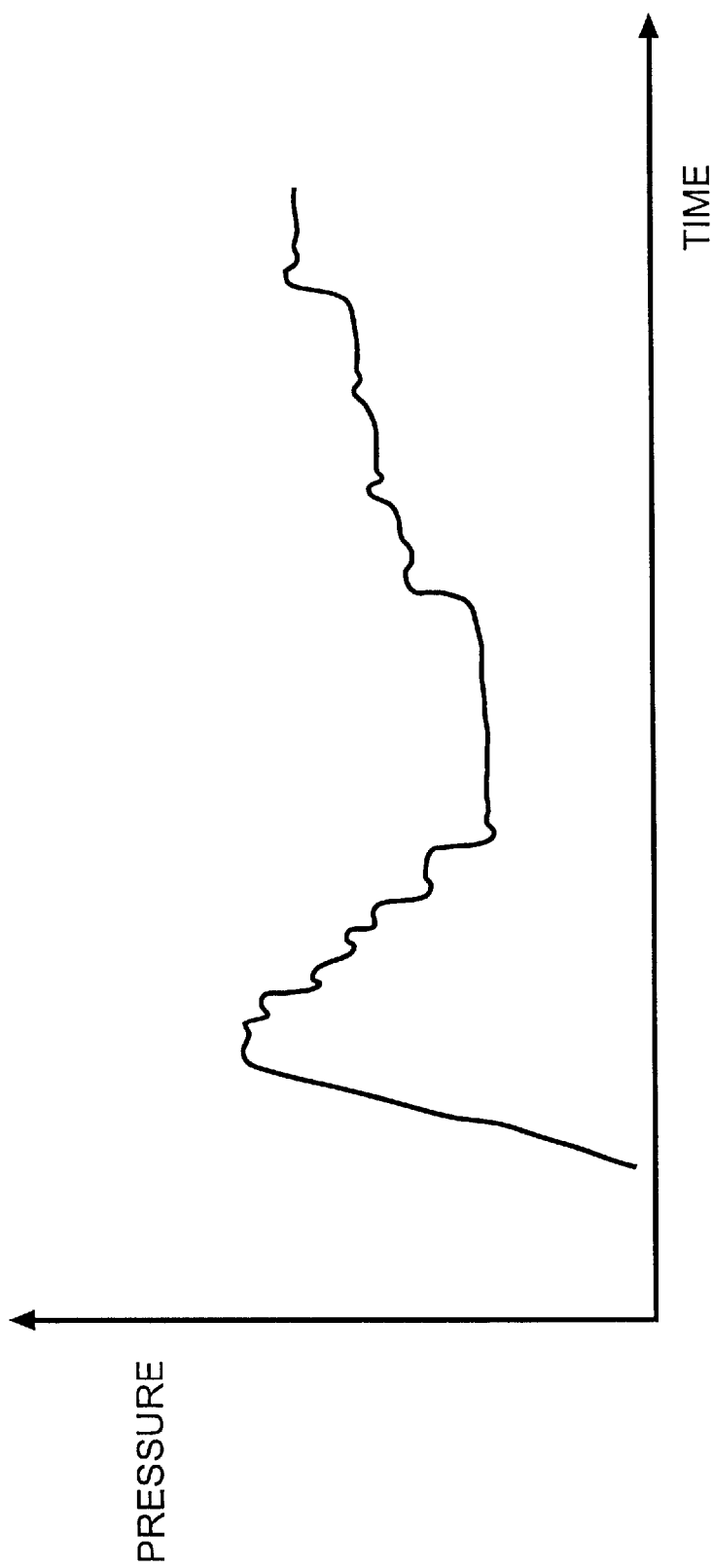

VEHICLE HYDRAULIC BRAKING SYSTEMS INCORPORATING MICRO-MACHINED TECHNOLOGY

CROSS REFERENCE TO RELATED APPLICATIONS

This application is a Continuation-In-Part of U.S. patent application Ser. No. 08/865,466, filed May 29, 1997, now U.S. Pat. No. 6,019,437, the disclosure of which is hereby incorporated by reference, and which application claimed priority to U.S. Provisional Patent Application No. 60/018,607 filed May 29, 1996, the disclosure of which is hereby incorporated by reference.

BACKGROUND OF THE INVENTION

MicroElectroMechanical Systems (MEMS) is a class of systems that are physically small, having features with sizes in the micrometer range. These systems have both electrical and mechanical components. The term "micro-machining" is commonly understood to mean the production of three-dimensional structures and moving parts of MEMS devices. MEMS originally used modified integrated circuit (computer chip) fabrication techniques (such as chemical etching) and materials (such as silicon semiconductor material) to micro-machine these very small mechanical devices. Today there are many more micro-machining techniques and materials available. The term "microvalve device" as used in this application means a complete, functioning valve having features with sizes in the micrometer range, and thus is by definition at least partially formed by micro-machining. Furthermore, a "microvalve device", as used in this application includes a microvalve, and may include other components such as pressure, temperature, flow or other types of sensors, pumps or other valves of various types. It should be noted that if components other than a microvalve are included in the microvalve device, these other components may be micro-machined components or standard sized (larger) components.

Various microvalve devices have been proposed for controlling fluid flow within a fluid circuit. A typical microvalve device includes a displaceable member or valve movably supported by a body. Depending on the type of valve, the valve may be operatively coupled to an actuator for movement between a closed position and a fully open position. When placed in the closed position, the valve blocks or closes a first fluid port that is placed in fluid communication with a second fluid port, thereby preventing fluid from flowing between the fluid ports. When the valve moves from the closed position to the fully open position, fluid is increasingly allowed to flow between the fluid ports.

U.S. Pat. No. 5,909,078 to Wood et al., the disclosure of which is incorporated herein by reference, describes a thermal arched beam microelectromechanical actuator that may be used to actuate a valve. Co-pending U.S. patent application Ser. No. 09/148,026, the disclosure of which is incorporated herein by reference, describes a proportional micromechanical device in the form of a actuator having plurality of expansive ribs arranged in a chevron arrangement on either side of a central spine moved to actuate a microvalve. An IEEE Technical Digest entitled "Compliant Electrothermal Microactuators", J. Jonsmann, O. Sigmund, S. Bouwstra, Twelfth IEEE International Conference on Micro Electro Mechanical Systems held Jan. 17–21, 1999, Orlando, Fla., pp. 588–593, IEEE Catalog Number: 99CH36291C, the disclosure of which is incorporated herein by reference, describes additional microelectromechanical actuators that may be used to actuate a valve.

Motor vehicles are commonly provided with brake systems to retard the rotation of the vehicle wheels. While all electric (non-hydraulic) brake systems have been proposed, most vehicles in use today employ a hydraulic or an electro-hydraulic braking system. In a conventional hydraulic vehicle braking system, the brake pedal is operatively connected to a master cylinder. The movement of the brake pedal causes a piston within the master cylinder to move, thereby forcing hydraulic fluid throughout the brake system and into cylinders located at each wheel. The pressurized hydraulic fluid then causes a piston located within the wheel brake cylinders to move. The movement of the brake piston causes a first friction surface to move into contact with a second friction surface operatively connected to the rotating wheel, thereby braking the wheel. A typical electro-hydraulic brake system includes a similar hydraulic system but additionally includes one or more sensors, such as a force sensor coupled to a vehicle's brake pedal, which develops a signal, which is indicative of a driver's demand for braking. This signal is sent to an electronic control unit, which in turn operates an electric motor to drive a pump to send the pressurized hydraulic fluid to the vehicle's brakes to develop the demanded braking force. Such electro-hydraulic brake systems are typically able to electronically control the brake pressure at each of the vehicle's wheels independently of the brake pressure at other ones of the vehicle's wheels.

The ability to independently control the braking force at each of the vehicle's wheels, together with certain special sensors, enables operation of a vehicle brake system in various special modes of operation. One of these special modes of operation is an anti-lock braking mode of operation, commonly referred to as ABS (for Anti-lock Brake System). Sensors in the vehicle brake system monitor the speed of the vehicle's wheels during braking. If the braking force demanded at a brake for a vehicle wheel causes the wheel to slip, the brake system can momentarily reduce the braking force of the brake at that wheel to allow the wheel to stop slipping, and thus provide optimal braking for the vehicle.

Another of these special modes of operation is traction control. During vehicle acceleration, a vehicle wheel may lose traction, and begin to spin. In the traction control mode of braking, the brake system is electronically actuated, without the driver stepping on the vehicle brake pedal, to individually brake the spinning wheel. When the wheel has slowed sufficiently to regain traction, the brake is released.

In most hydraulic and electro-hydraulic braking systems, solenoid valves are used to control the brake pressure in the brake lines. Solenoid valves may be digitally controlled in that the solenoid is either energized or deenergized and the valve is thereby moved to either a fully open position or a full open position. Partially open or throttled positions of the valve are brief transient positions during movement between the fully closed and the fully open position. During use, digitally controlled solenoid valves respond rapidly to actuation signals, which causes a fluid hammer effect. This problem is shown in FIGS. 1 and 1a. FIG. 1 shows a graph of a pressure profile during the operation of a conventional ABS in a typical light vehicle brake system. The horizontal axis represents time, with each division corresponding to 100 milliseconds. Both wheel speed and brake pressure are indicated on the vertical axis. Graph line A indicates the wheel speed and graph line B shows the front brake pressure. Graph line B illustrates the sudden changes in front brake pressure and pressure spikes which are present in the brake line during operation of the ABS. FIG. 1a shows an expanded view, corresponding to area labeled as view "a" in FIG. 1, of the front brake pressure. The pressure spikes shown in FIG. 1a can be as high as 400 to 600 pounds per square inch (psi). A rapid oscillation in a signal or pressure is referred to as "ringing". The expanded view in FIG. 1a also illustrates the ringing which occurs on the brake line. Switching the state of a conventional solenoid valve causes a damped oscillation of the pressure (the ringing) in the brake line. The ringing radiates along the length of the brake line, including under the vehicle, and causes the brake line to physically vibrate. The vibration is perceived by occupants of the vehicle as audible noise. Ideally, it would be desirable to provide a hydraulic or electro-hydraulic braking system in which this audible noise is reduced.

SUMMARY OF THE INVENTION

This invention is directed to hydraulic or electro-hydraulic braking systems which use micro-machined technology, such as microvalves. The use of microvalves also allows for reduced package size of the systems. In particular, the hydraulic or electro-hydraulic braking systems according to this invention employ, inter alia, microvalves, dump microvalves, changeover microvalves, proportional control microvalves, non-proportional control microvalves, and micro-machined transducers.

In a preferred embodiment of the invention, a hydraulic braking system includes a braking device adapted to provide a braking force to at least one wheel for braking the vehicle and at least one main hydraulic conduit. The main hydraulic conduit extends from a source of pressurized brake fluid to the braking device. The source of pressurized brake fluid and the main hydraulic conduit cooperate to supply pressurized fluid to the braking device. The hydraulic system further includes at least one microvalve disposed in the main hydraulic conduit between the source and the braking device. The microvalve has three operating states, including an open state, a selectively variable flow-restricted state, and a closed state. The microvalve is capable of indefinite operation in any of these three states and is adapted to selectively control the pressurized brake fluid supplied to the braking device.

Various objects and advantages of this invention will become apparent to those skilled in the art from the following detailed description of the preferred embodiment, when read in light of the accompanying drawings.

BRIEF DESCRIPTION OF THE DRAWINGS

(FIG. 1a is an enlarged view of the area labeled "a" in FIG. 1.)

FIG. 4a is a graph of a predicted pressure profile from the electro-hydraulic brake system shown in FIG. 4.

DETAILED DESCRIPTION OF THE INVENTION

Figure 1:
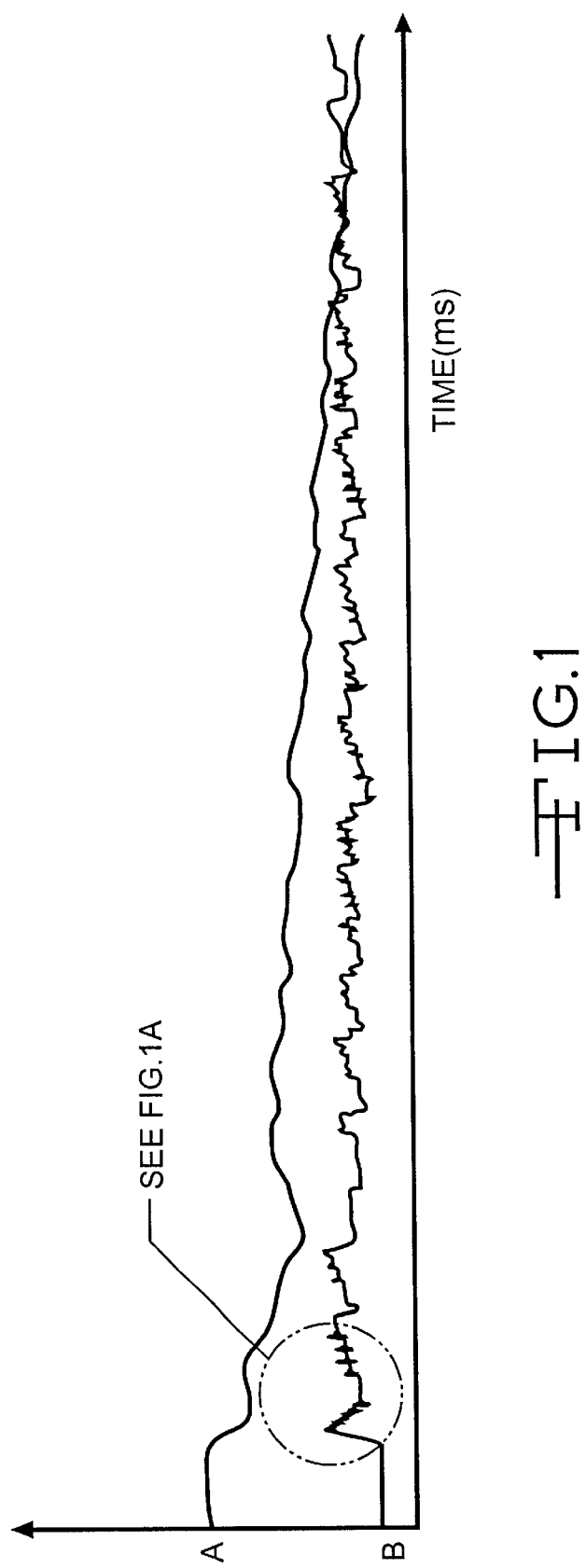
FIGS. 1 and 1a are graphs of a pressure profile during the operation of a conventional electro-hydraulic braking system.
Figure 1A:
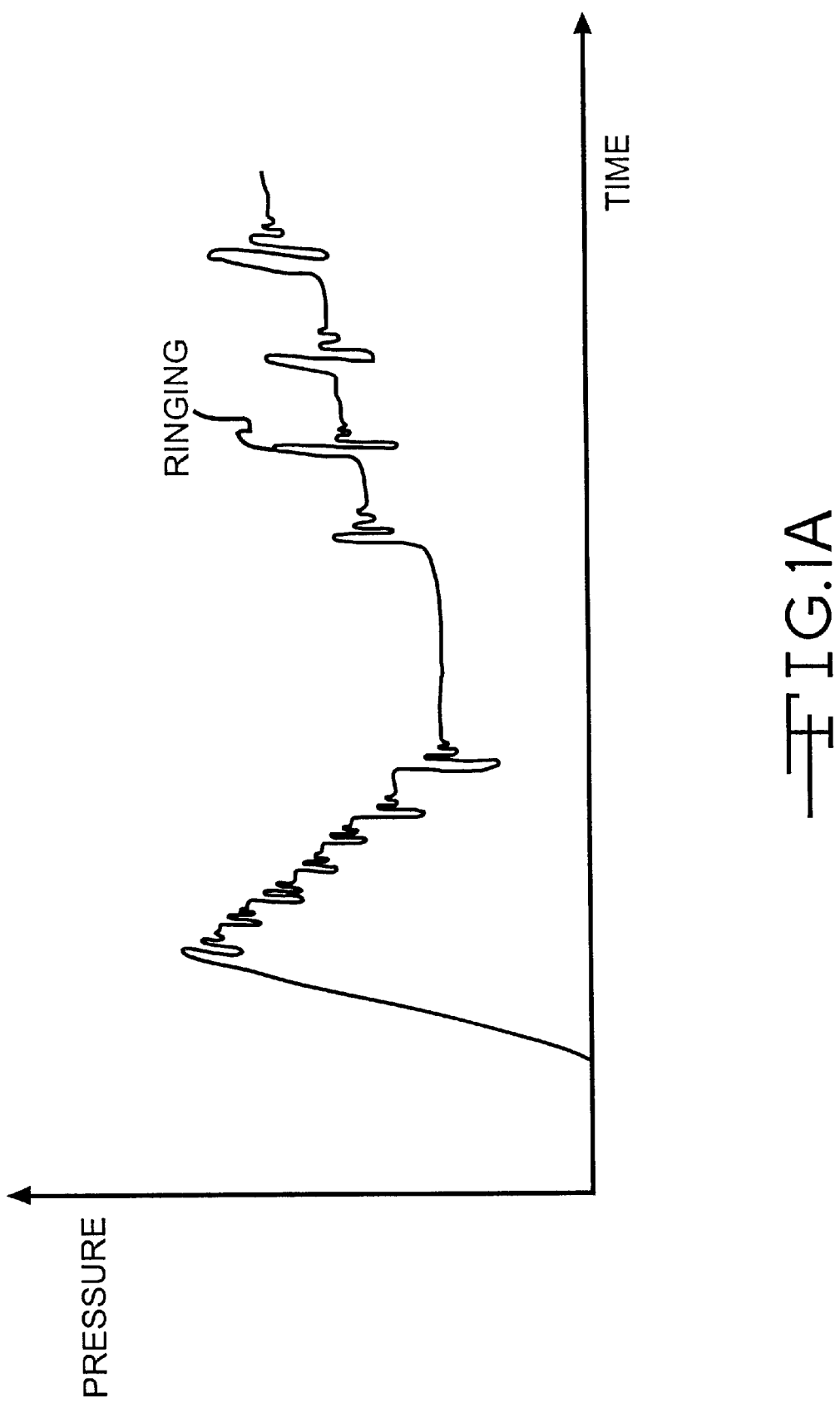
Figure 2:
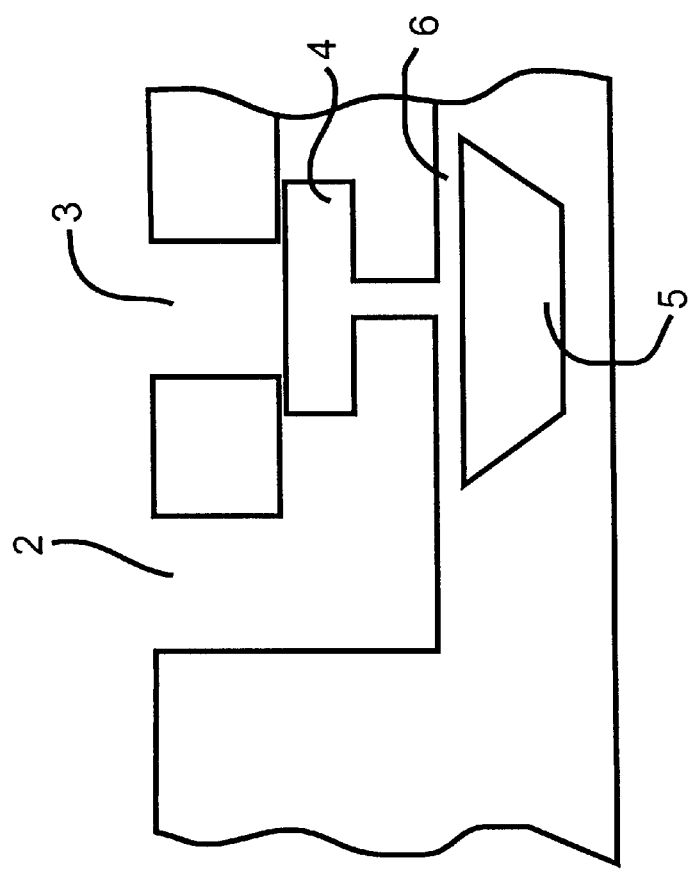
FIG. 2 is a schematic representation of a microvalve.

Referring now to the drawings, there is illustrated in FIG. 2 a schematic representation of a microvalve. Typically, a microvalve is a multi-layered structure that is formed in a silicon or silicon based housing. As shown in FIG. 2, the microvalve generally includes an inlet port 2 which is separated from an outlet port 3 by an actuating device 4. Many microvalves include a closed chamber 5 having a flexible member 6 which is operatively connected to the actuating device 4 for controlling the flow from the inlet 2 to the outlet 3 of the microvalve. Various methods are used to bias the flexible member 6 and thereby open and close the microvalve.

A particular type of microvalve has a chamber which is etched in silicon, filled with fluid, and hermetically sealed. The fluid expands when heated and the expansion biases a flexible wall. The biasing of the wall into the fluid passageway between the inlet port and the outlet port cuts off the fluid path, thereby closing the microvalve. When the fluid cools, it contracts and the wall of the chamber returns to its original position, thereby restoring the fluid path and opening the microvalve. This type of microvalve, having an actuator depending upon thermal expansion and contraction for operation, may be referred to as a thermally actuated microvalve. As will be shown below, however, not all thermally actuated microvalves have this same structure.

The fluid in the chamber of this type of microvalve may be heated in a number of ways. For example, resistive elements may be etched in silicon inside the chamber and may be electrically connected to a controlled voltage or current source. When a current is passed through the resistive elements, the elements generate heat and thereby heat the fluid in the chamber. In another example, radio frequency energy or light energy may be focused on the fluid in the cavity. In another example, conductive, convective, or radiated heating of the material surrounding the chamber may be used to heat the fluid in the chamber. Another type of microvalve includes a flexible diaphragm instead of the wall of a closed chamber as the flexible member. An electrode biases the flexible diaphragm to cover the microvalve inlet. Still another type of microvalve uses piezoelectric forces to move a flexible member so as to selectively actuate the valve. Indeed, any suitable sort of actuator may be used to operate the microvalves of this invention, including without limitation micro-machined valve actuators, macro-machined valve actuators, thermal actuators, electrical actuators, and hydraulic actuators.

While any type of microvalve may be used with this invention, the microvalve employed in the hydraulic or electro-hydraulic braking system according to the invention described herein preferably has the following characteristics:

Fluid pressure capability: ≧3000 psi (steady state), and ≧5000 psi (spike)

Response time: <4 milliseconds (ms)

Flow rate: Equivalent to 0.75 mil diameter orifice

Temperature: −20° C. to 125° C. (Operating range)

Figure 3A:
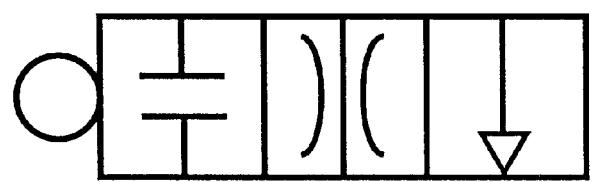
FIGS. 3a through 3c are schematic symbol representations of various microvalves which may be used according to this invention.
Figure 3B:
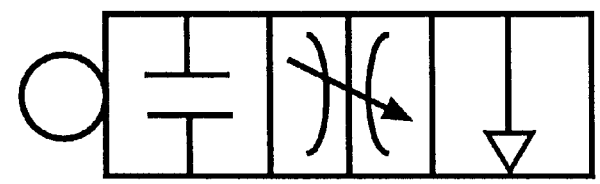
Figure 3C:
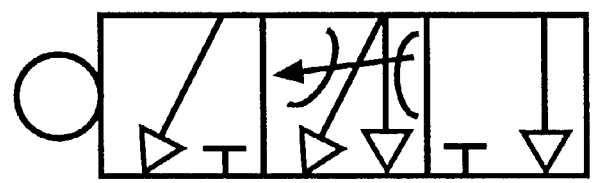

Schematic representations of several types of microvalves are shown in FIGS. 3a through 3c with unique valve symbols. As shown therein, a circle is used to represent the associated actuator symbol. In FIG. 3a, the microvalve symbol shows three states: an open state, a flow-restricted state, and a closed state. Unlike a digitally controlled solenoid valve, which is essentially open or closed, a microvalve may be controlled with a smoother transition, upon actuation, from its present position (e.g. open) to the opposite position (e.g. closed). In FIG. 3a this smoother transition has been represented symbolically as an intermediate flow restricted position between the actuated state and the unactuated state, which flow restricted position is momentarily occupied during the transition between the open and closed positions.

Microvalves may be normally open or normally closed and are shown in the figures in their unactuated (normal) position. Preferably, a microvalve utilized in the braking systems according to the invention is configured for a controlled rate of flow through the microvalve. As shown in FIG. 3b, the preferred microvalve has three states: a fully open state, a variable flow restricted state, and a fully closed state. The microvalve shown in FIG. 3b may be referred to as a proportionally controlled microvalve because the flow rate through the microvalve is proportional to a control signal applied thereto. For example, in a normally open proportionally controlled microvalve using resistive elements to heat a fluid in an expansion chamber, a current of 0 micro-amps corresponds to 100% of the flow rate (fully open), a current of X micro-amps corresponds to 0% of the flow rate (fully closed), and a current of 50% of X micro-amps corresponds to the position of the microvalve permitting a flow rate equal to 50% of the flow rate in the full open position.

A proportionally controlled microvalve, as shown in FIG. 3b, may be used in place of the microvalve shown in FIG. 3a by utilizing appropriate control signals to transition the proportionally controlled microvalve between its fully open and fully closed states. For example, a digital control signal could be applied to the proportionally controlled microvalve with a value of 0 corresponding to an off state in which no current (0 micro-amps) is supplied to the proportionally controlled microvalve and the proportionally controlled microvalve is fully open, and a value of 1 corresponding to a maximum on state in which the current required to fully close the valve (X micro-amps) is supplied to the proportionally controlled microvalve. In this case, the proportionally controlled microvalve operates essentially as the microvalve described with respect to FIG. 3a. Specifically, the proportionally controlled microvalve would have three states: an open state, a flow-restricted state, and a closed state.

FIG. 3c shows a schematic symbol for a proportionally controlled 3-way microvalve. This microvalve operates similar to the microvalve in FIG. 3b, as described above, but provides proportional control between two fluid paths. Specifically, the microvalve shown in FIG. 3c is configured to transition between being the following states:

A. fully open to a first fluid path and fully closed to a second fluid path;

B. variable flow restricted in both the first and second fluid paths; and

C. fully closed to the first fluid path and fully open to the second fluid path.

In other words, with the appropriate control signal, the microvalve shown in FIG. 3c may be Y % open to the first fluid path and Z % open to the second fluid path.

As described above, a solenoid valve opens essentially instantaneously once the force required to open it is achieved. Similarly, the solenoid valve essentially closes instantaneously once the force to close it is achieved. The transport of the plunger can occur in under one millisecond and causes the fluid hammer effect, namely the pressure spikes in the brake line, and the noise due to ringing. Furthermore, the transitioning of a solenoid valve itself causes significant audible noise.

A significant advantage is achieved by utilizing microvalves in the hydraulic circuit according to the invention. Specifically, in contrast to a solenoid valve, the speed of opening and closing of a microvalve can be easily controlled to provide a smoother transition which reduces the fluid hammer effect and subsequent ringing, thereby substantially reducing the noise in the hydraulic or electro-hydraulic braking system. Also, in comparison with a solenoid valve, the transitioning of a microvalve is essentially silent. By utilizing a microvalve which provides a variable flow restriction, the opening and closing of the microvalve can be performed at a controlled rate and the fluid hammer effect can be eliminated altogether. Moreover, using microvalves in place of solenoid valves achieves a significant size reduction and better component integration.

Figure 4:
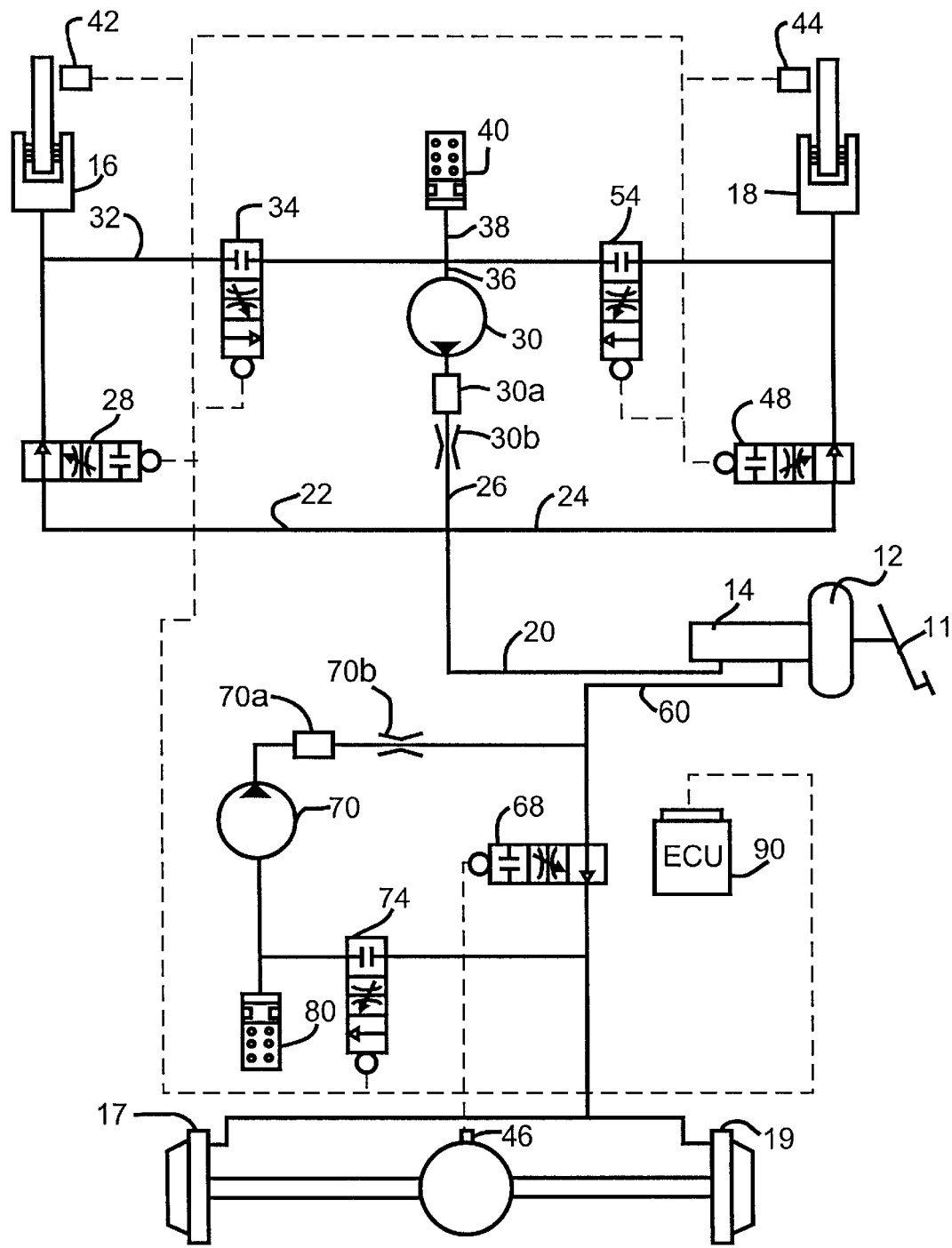
FIG. 4 is a schematic representation of a first embodiment of an electro-hydraulic brake system according to the invention.

FIG. 4 shows a schematic representation of a first embodiment of an ABS-capable brake system according to the invention. A plurality of microvalves and hydraulic components, as described below, are used in the illustrated brake system. The microvalves and components are housed in a hydraulic control unit (HCU) comprising a housing body having a plurality of bore cavities in which the microvalves and components are seated. Passageways or conduits are formed in the HCU body to provide fluid communication between the various microvalves and components. In FIG. 4, hydraulic fluid connections between components are represented as solid lines.

As shown in FIG. 4, the first embodiment of the brake system according to the invention includes a brake pedal 11 which is connected to a brake booster 12 and a master cylinder 14. The brake booster 12 provides for a force or "boost" to the master cylinder 14 which assists the pedal force created by the driver to actuate the master cylinder 14 so that the master cylinder 14 acts as a source of pressurized brake fluid to the brake system. The master cylinder 14 is connected to a front brake circuit and a rear brake circuit through a pair of brake lines 20 and 60, respectively.

The front brake circuit includes front wheel brake cylinders 16 and 18 which are connected to the master cylinder 14 via a line 20. The line 20 divides into a set of lines 22, 24 and 26. The line 22 is connected to the wheel brake cylinder 16. The flow path for the line 22 runs through a normally open microvalve 28, which serves as an apply microvalve. An outlet side of a pump 30 is connected to the line 26 via a conventional attenuator 30a and a conventional orifice 30b.

A line 32 branches from the line 22 between the apply microvalve 28 and the wheel brake cylinder 16. The flow path for the line 32 runs through a normally closed microvalve 34, which serves as a dump microvalve. Line 32 is in hydraulic communication with lines 36 and 38 which are connected to the inlet side of the pump 30 and a low pressure accumulator 40, respectively.

The line 24 similarly supplies the wheel brake cylinder 18. An apply microvalve 48 is interposed between the master cylinder 14 and the wheel brake cylinder 18 to selectively control the pressurized brake fluid supplied to the wheel brake cylinder 18. A dump microvalve 54 controls flow through a flow path from the line 24 between the apply microvalve 48 and the wheel brake cylinder 18, to the line 36 to the inlet side of the pump 30 and to the line 30 to the low pressure accumulator 40.

As indicated above, the rear wheel brake cylinders 17 and 19 are connected to the master cylinder 14 through the line 60. The rear brake circuit for the rear wheel brake cylinders 17 and 19 is configured somewhat differently in that the master cylinder 14 is connected to the brake cylinders 17 and 19 through the single line 60 and includes only a single pump 70, a conventional attenuator 70a, a conventional orifice 70b, a low pressure accumulator 80, an apply microvalve 68, and a dump microvalve 74 for both rear wheel brake cylinders 17 and 19.

The first embodiment has been described with respect to an ABS-capable braking system for a vertically split brake system with individual brake controls for the front wheel brake cylinders 16 and 18 and a dual brake control for rear wheel brake cylinders 17 and 19. One skilled in the art will appreciate that the rear wheel brake cylinders 17 and 19 may be alternately configured with individual brake controls similar to the front brake circuit described above. Similarly, the front brake circuits supplying the front wheel brake cylinders 16 and 18 may be alternately configured with a dual brake control similar to the rear brake circuit described above. Moreover, the brake system described in the first embodiment may be readily adapted to a diagonally split brake system with individual and/or dual brake controls.

The apply microvalves 28, 48, and 68, the dump microvalves 34, 54, and 74, and various sensors, including wheel speed sensors 42 and 44, and sensor 46, are electronically coupled to an electronic control unit (ECU) 90. Electrical connections to the ECU 90 are represented in FIG. 4 as dashed lines.

Operation of the ECU 90 for the first embodiment, generally, is as follows. The ECU 90 monitors the various sensors and is configured to respond to detected driving conditions by sending control signals which selectively actuate the microvalves. For example, the ECU 90 cycles through various modes in response to detecting an ABS event. Typically, an ABS event occurs when a wheel is about to lock. The ABS event may be detected, for example, by an unusual decrease in wheel speed during braking.

Although the various modes discussed below are described with reference to the wheel brake cylinder 16, the same modes are applicable to the wheel brake cylinder 18. Similar modes are also applicable to the rear wheel brake cylinders 17 and 19, however, these wheel brake cylinders are not individually controlled.

In normal brake mode, the pump 30 is turned off, the apply microvalve 28 is unactuated (and thus open), and the dump microvalve 34 is unactuated (and thus closed). When the driver presses the brake pedal 11, pressure builds from the master cylinder 14 into the line 20. The pressure in the line 20 also builds through the line 22 to the wheel brake cylinder 16, passing through the normally open apply microvalve 28. The pressure does not pass through the normally closed dump microvalve 34 into the lines 36 or 38.

When the brake pedal 11 is released, pressure in the master cylinder 14 is reduced, thereby reducing the pressure at the wheel brake cylinder 16. This reduction in pressure causes the pressure to be relieved from the wheel brake cylinder 16 to bleed off into the master cylinder 14 in the reverse flow direction of the brake path described above.

During a braking condition in which an ABS event is detected (for example, a slipping wheel), an ABS dump mode is entered to reduce the pressure in the brake wheel brake cylinder of the detected slipping wheel. For example, this may occur if the front wheel associated with the wheel brake cylinder 16 begins to slip during braking. In ABS dump mode, the apply microvalve 28 is actuated by the ECU 90 to a closed position to prevent the pressurized fluid in the line 20 from influencing pressure at the wheel brake cylinder 16.

Also, in the ABS dump mode, the dump microvalve 34 is intermittently energized (i.e. pulsed) by the ECU 90 to an open position to intermittently decrease the pressure at the wheel brake cylinder 16. While the dump microvalve 34 is pulsed open, the pressurized fluid in the wheel brake cylinder 16 bleeds off into the low-pressure accumulator 40. Upon entering ABS dump mode, the pump 30 is turned on to assist in reducing the pressure on the wheel brake cylinder 16 by pulling fluid through the line 32 and to ensure that the low pressure accumulator 40 does not fill completely with fluid. The low-pressure accumulator 40 allows rapid bleed off of brake fluid before the pump can begin to assist in the relieving of pressure on the wheel brake cylinder 16. The pump 30 returns the bled off brake fluid to lines 20 and 24 in addition to the master cylinder 14.

From the ABS dump mode, after a pre-determined condition, the ECU 90 enters into an ABS hold mode to maintain the braking fluid pressure at the wheel brake cylinder 16 at a constant level. The pre-determined condition may, for example, correspond to an amount of time determined to be necessary to reduce the pressure at the wheel brake cylinder 16 to an estimated desired pressure. In ABS hold mode, the apply microvalve 28 is deenergized to a closed position and the dump microvalve 34 is unactuated and assumes its normally closed position. This causes the pressure in the line 22 between the microvalve 28 and wheel brake cylinder 16 to remain at its current pressure level, thereby maintaining constant pressure at the wheel brake cylinder 16.

The ECU 90 continually monitors the braking condition and cyclically switches between the ABS dump mode and the ABS hold mode to relieve and maintain pressure at the wheel brake cylinder 16 in order to limit the wheel slippage. After the wheel stops slipping, the pressure to the wheel brake cylinder 16 can be increased again to maximize braking force. In order to accomplish this, the ECU 90 enters an ABS apply mode to apply additional pressure to the wheel brake cylinder 16.

In ABS apply mode, the dump microvalve 34 is deenergized and assumes its normally closed position. The apply microvalve 28 is initially deenergized (thereby assuming its normally open position) and is intermittently actuated (i.e. pulsed) to its closed position in order to control the application of additional pressure to the wheel brake cylinder 16. The pump 30, which was turned on in response to detection of an ABS event, remains on in order to provide additional fluid pressure from its outlet into the line 26.

FIG. 4a shows a predicted graph of a pressure profile from a brake system using microvalves according to the first embodiment of the invention. As shown in FIG. 4a, the pressure spikes are substantially eliminated and the ringing is substantially reduced. One skilled in the art will appreciate that the foregoing description of the operation of ECU 90 is exemplary only and other control methods are possible.

Figure 5:
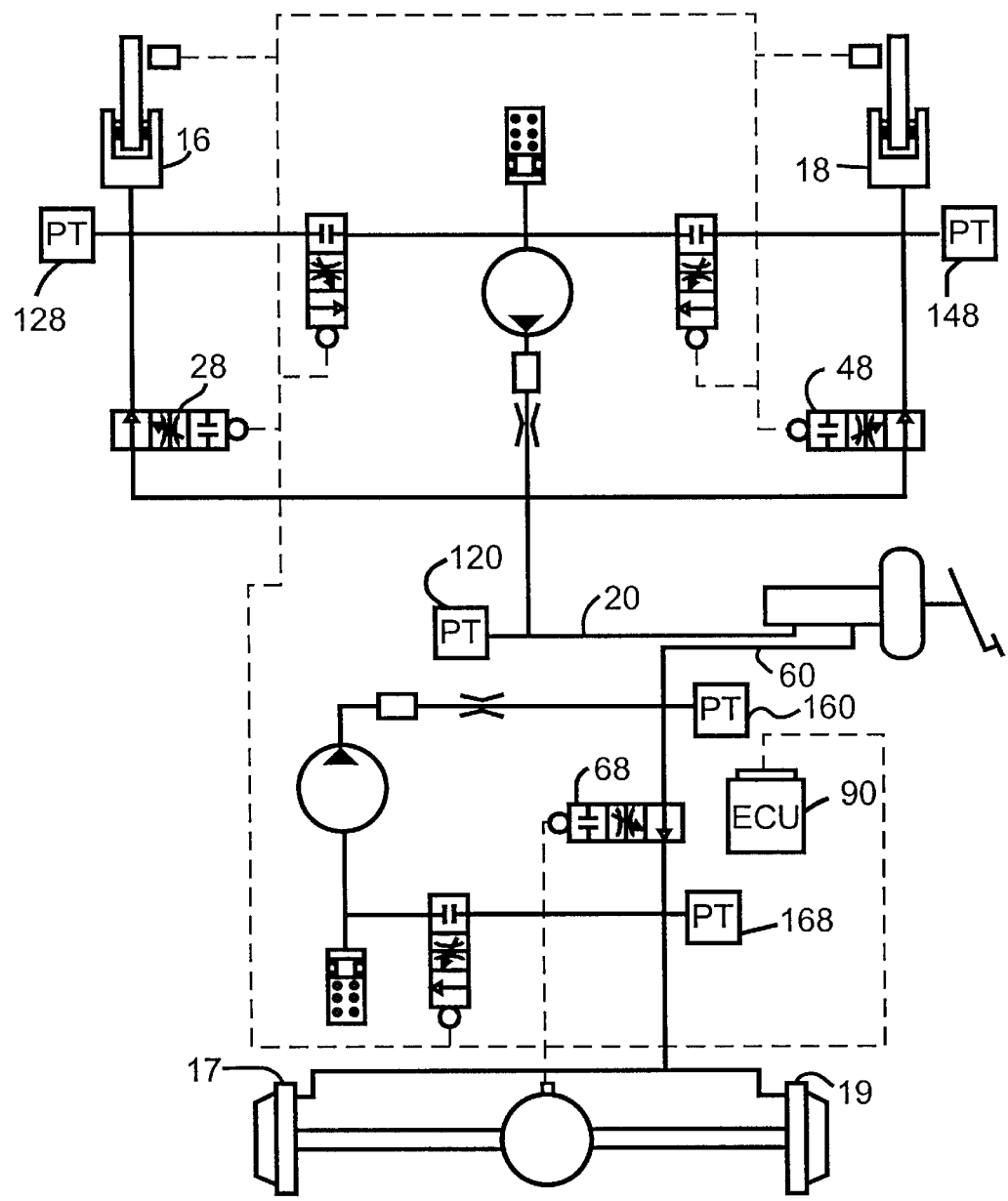
FIG. 5 is a schematic representation of a second embodiment of an electro-hydraulic brake system according to the invention.

FIG. 5 shows a schematic representation of a second embodiment of an ABS-capable braking system according to the invention. The second embodiment is similar to the first embodiment, but the second embodiment includes a number of pressure transducers. These pressure transducers may be micro-machined products fabricated from silicon or other suitable material. The circuit shown in FIG. 5 includes a pair of pressure transducers 120 and 160 connected to the lines 20 and 60, respectively. Also shown are pressure transducers 128 and 148 respectively connected to the lines 22 and 24 between the apply microvalves 28 and 48 and the wheel brake cylinders 16 and 18, respectively. A further pressure transducer 168 is connected to the line 60 between the apply microvalve 68 and the wheel brake cylinders 17 and 19. Each pressure transducer 120, 128, 148, 160, and 168 provides a respective signal (not shown) to the ECU 90 which indicates the fluid pressure sensed by the pressure transducer.

As shown in FIG. 5, the second embodiment according to the invention provides the advantage of being able to determine the actual fluid pressure present in the various brake lines. With the actual values, the ECU 90 can utilize the various pressure readings to better control the brake system. As described above with respect to the first embodiment, for example, the ECU 90 cycles between an ABS dump mode and an ABS hold mode based on a pre-determined amount of time estimated to be necessary to reduce the pressure at the wheel brake cylinder 16 to a desired pressure. However, in the second embodiment, the actual pressure at wheel brake cylinder 16 may be determined by pressure transducer 128. Therefore, the ECU 90 can better control the brake system by determining when to switch from an ABS dump mode to an ABS hold mode based on actual pressures as opposed to estimated pressures.

Moreover, the circuit shown in FIG. 5 can achieve better proportional control by utilizing the pressure transducers as shown in conjunction with proportionally controlled apply and dump microvalves. Specifically, by determining the actual pressures, the ECU 90 can make smoother adjustments between the current pressure and the desired pressure at the various points on the brake line.

Figure 5A:
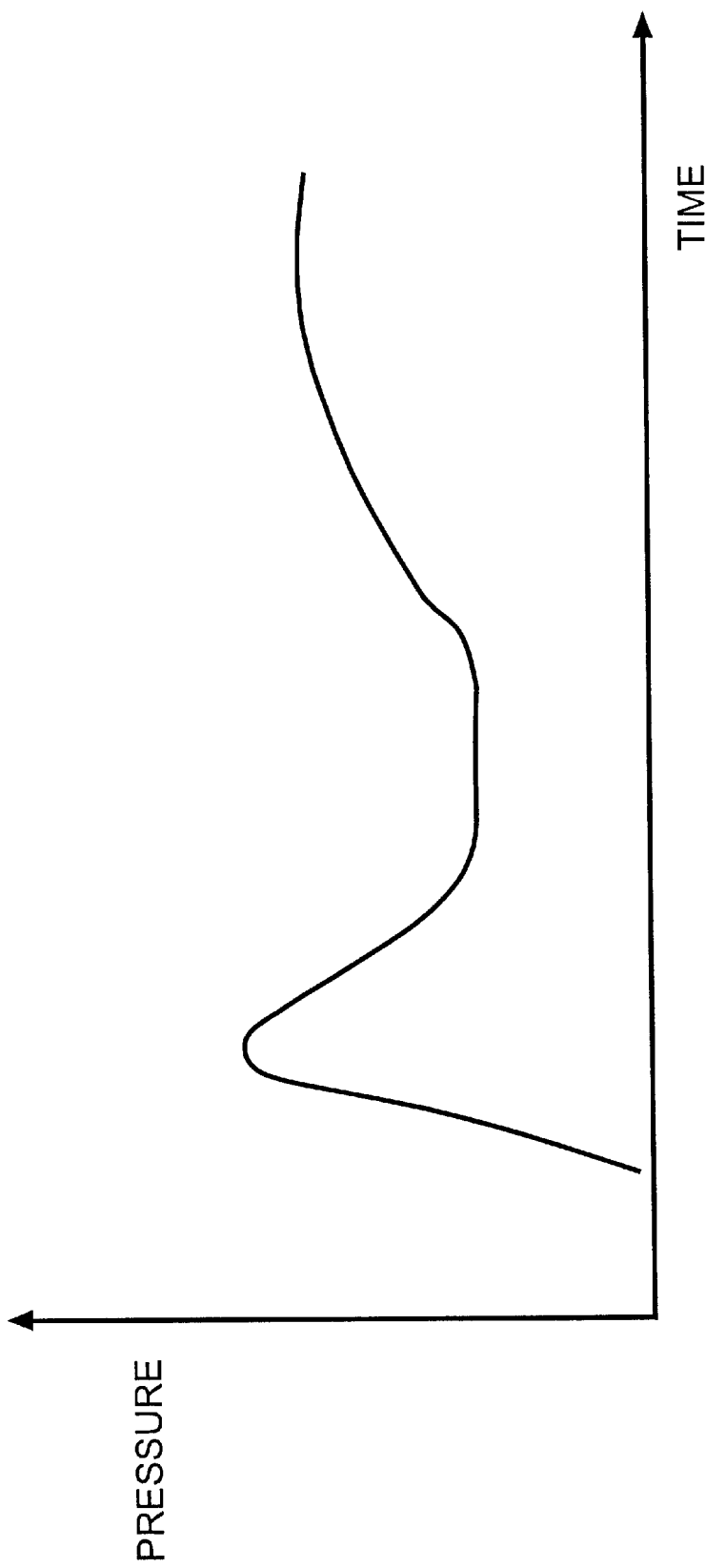
FIG. 5a is a graph of a predicted pressure profile from the electro-hydraulic brake system shown in FIG. 5.

FIG. 5*a* shows a predicted graph of a pressure profile from an ABS-capable braking system according to the second embodiment of the invention wherein proportionally controlled apply and dump microvalves and pressure transducers are utilized. As shown in FIG. 5*a*, both the pressure spikes and the ringing are substantially eliminated. Additional advantages in size and integration of the brake system may be achieved by fabricating at least some of the microvalves and the pressure transducers on the same silicon chip or integrated device.

Figure 6:
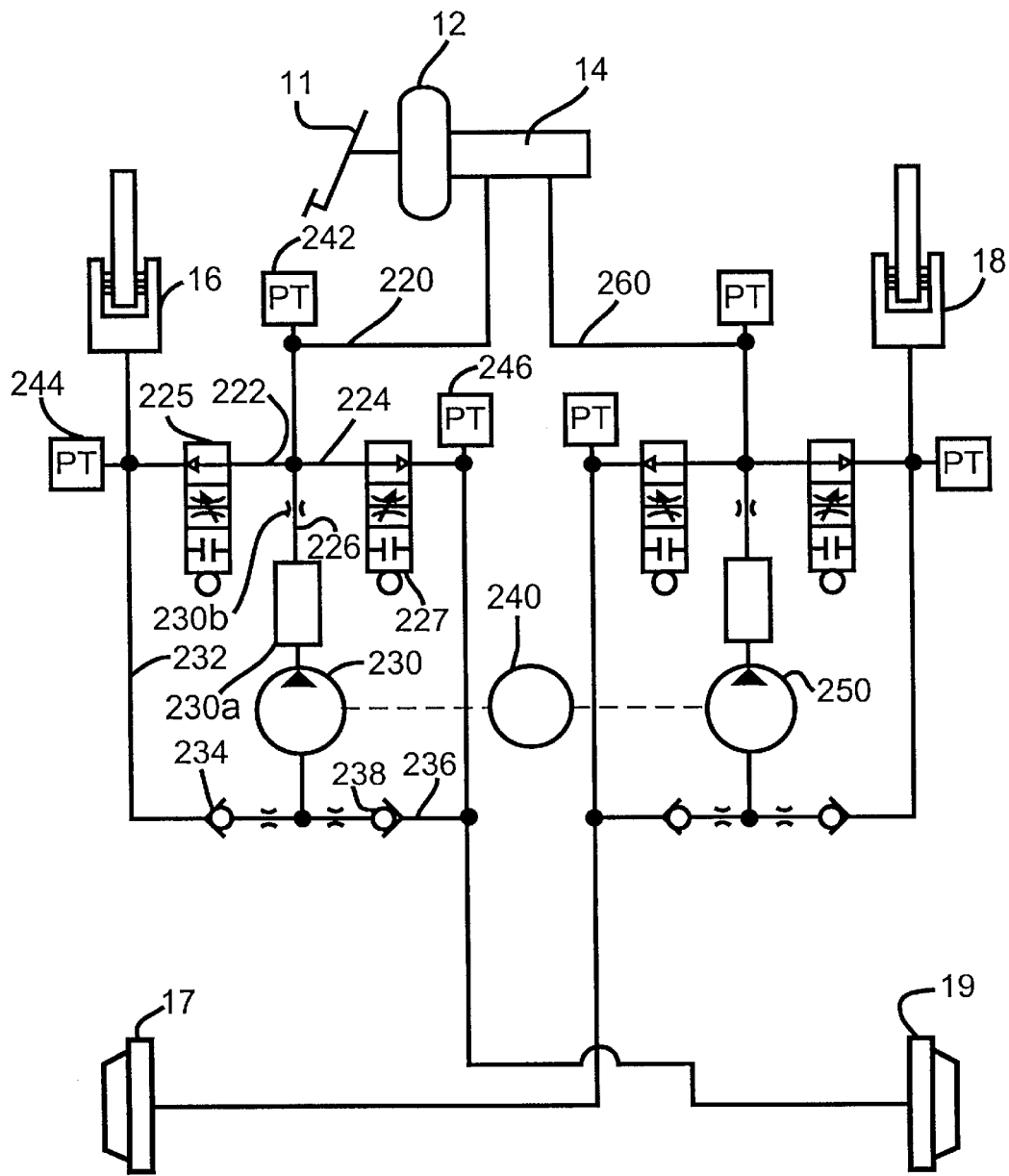
FIG. 6 is a schematic representation of a third embodiment of an electro-hydraulic brake system according to the invention.

FIG. 6 shows a schematic representation of a third embodiment of a hydraulic circuit according to the invention. The third embodiment according to the invention includes a brake pedal 11 which is connected to a brake booster 12 and a master cylinder 14. Similarly to the previously described braking systems, the master cylinder supplies pressurized fluid to the front wheel brake cylinders 16 and 18 and the rear brake cylinders 17 and 19. The master cylinder 14 is hydraulically connected to two similarly arranged separate brake circuits via the brake lines 220 and 260, respectively. The third embodiment is configured in a diagonally split arrangement in which diagonally opposed wheels are controlled by the same circuit. For the purpose of description, only the brake circuit for the front wheel brake cylinder 16 and the rear wheel brake cylinder 19 is discussed in detail below.

Wheel brake cylinders 16 and 19 are connected to the master cylinder 14 via the line 220, which is in hydraulic communication with three lines, i.e. lines 222, 224 and 226. The line 222 is connected to the wheel brake cylinder 16. The flow path for the line 222 runs through a proportionally controlled microvalve 225. The line 224 is hydraulically connects the line 220 to the wheel brake cylinder 19. The flow path for the line 224 runs through a proportionally controlled microvalve 227. The line 226, which includes a conventional attenuator 230*a* and a conventional orifice 230*b*, hydraulically connects the line 220 to the discharge of the pump 230.

A line 232 branches from the line 222 between the microvalve 225 and the wheel brake cylinder 16. The flow path for the line 232 runs through a one-way check valve 234 to an inlet side of the pump 230. A line 236 branches from the line 224 between the microvalve 227 and the wheel brake cylinder 19. The flow path for the line 236 runs through a one-way check valve 238 to the inlet side of the pump 230. As indicated above, the outlet side of the pump 230 is connected to the line 226. A motor 240 is coupled to the pump 230. Although a single motor 240 has been shown to drive the pump 230 and a corresponding pump 250 used for the brake circuit for the wheel brake cylinders 18 and 17, separate motors may also be used for each pump.

The third embodiment optionally includes pressure transducers 242, 244, and 246 connected to the lines 220, 222, and 224, respectively, to determine the actual fluid pressure at the master cylinder 14 and the actual fluid pressure out of the microvalves 225 and 227 to the wheel brake cylinders 16 and 19, respectively. The third embodiment also includes an ECU (not shown) coupled to various sensors, including the pressure transducers 242, 244, and 246, and wheel speed sensors (not shown). The ECU is configured to monitor the various sensors and to respond to detected driving conditions by sending control signals which actuate the proportionally controlled microvalves 225 and 227.

Operation of the ECU for the third embodiment, generally, is as follows. The ECU cycles through various modes in response to detecting an ABS event. The ECU is initially in a normal brake mode. Under certain braking conditions, in which an ABS event is detected, the ECU will enter an ABS control mode to control the pressure applied to the brakes. The ABS control mode includes a controlled dump state, which relieves pressure on the brakes, and a controlled apply state, which builds pressure on the brakes. If the ABS event is no longer detected, the ECU returns to the normal brake mode.

In the normal brake mode, the pump 230 is turned off, the microvalve 225 is fully open, and the microvalve 227 is fully open. When the driver presses the brake pedal 11, pressure builds from the master cylinder 14 into the line 220. The pressure in the line 220 also builds through lines 222 and 224 to the wheel brake cylinders 16 and 19, passing through the fully open microvalves 225 and 227.

During a braking condition in which an ABS event is detected (i.e. a slipping wheel), the ABS control mode is entered to control the pressure at the wheel brake cylinders 16 and 19. In the ABS control mode, the pressures in the lines 220, 222, and 224 are detected by the transducers 242, 244, and 246, and the microvalves 225 and 227 are proportionally controlled depending on detected braking conditions. For example, if the wheel associated with the wheel brake cylinder 16 begins to slip, the ABS control mode may first enter a controlled dump state to relieve pressure at the wheel brake cylinder 16. In this state, the microvalve 225 is at least partially closed to restrict the flow of pressurized fluid from the master cylinder 14 to the wheel brake cylinder 16. The pump 230 is turned on to assist in relieving the pressure from the wheel brake cylinders 16 and 19. According to the invention, the microvalves 225 and 227 are separately controlled such that the pressures in the lines 222 and 224 may differ from each other depending on the detected braking conditions at the respective wheel brake cylinders 16 and 19.

Also in ABS control mode, it may become desirable to build brake pressure at one or both of the wheel brake cylinders 16 and 19. In this case, the brake system enters a controlled apply state. In order to achieve a controlled apply, the microvalve 225 is at least partially opened to allow the pressure from the master cylinder 14 to be applied to the wheel brake cylinder 16. The pump 230 is turned off to cause pressure to build. As noted above, the microvalves 225 and 227 are separately controlled such that the pressures in the lines 222 and 224 may differ from each other depending on the detected braking conditions at the respective wheel brake cylinders 16 and 19. Depending on the braking conditions detected at each wheel, while in the ABS control mode, the ECU can, for example, relieve pressure from the wheel brake cylinder 16 and simultaneously build pressure at the wheel brake cylinder 19. In this case, the pump 230 would remain on to assist in relieving pressure from wheel brake cylinder 16. The microvalve 225 would be at least partially closed to reduce the pressure being applied from the master cylinder 14. The microvalve 227 would be at least partially open to allow the pressure from the master cylinder 14 to be applied to the wheel brake cylinder 18.

Figure 7:
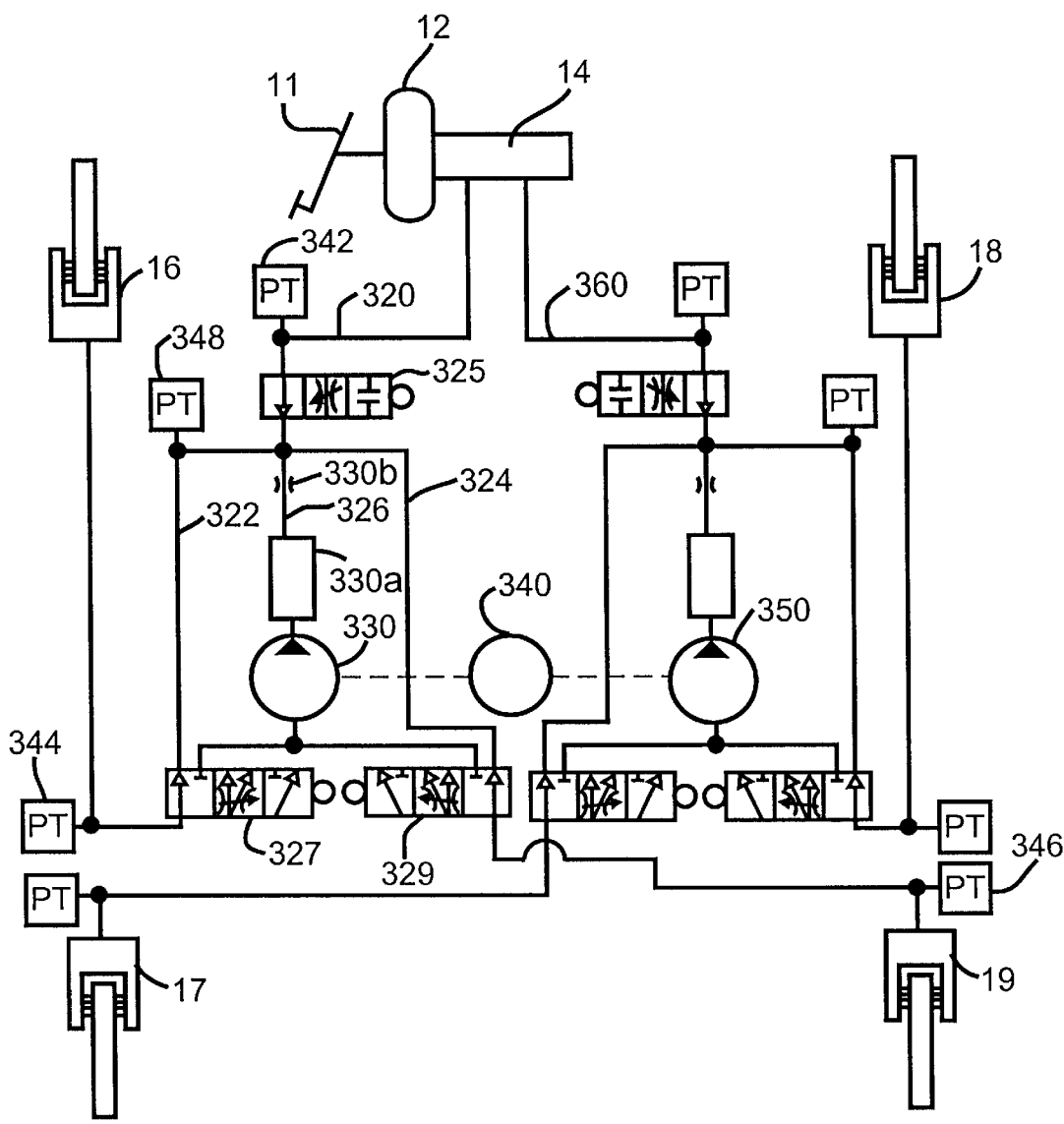
FIG. 7 is a schematic representation of a fourth embodiment of an electro-hydraulic brake system according to the invention.

FIG. 7 shows a schematic representation of a fourth embodiment of a hydraulic brake system according to the invention. The fourth embodiment according to the invention includes a brake pedal 11 which is connected to a brake booster 12 and a master cylinder 14. The master cylinder 14 is connected to two similarly arranged separate brake circuits via the brake lines 320 and 360, respectively. The fourth embodiment is configured in a diagonally split arrangement in which diagonally opposed wheels are controlled together. For the purposes of description, only the brake circuit for the wheel brake cylinder 16 and the wheel brake cylinder 19 is discussed in detail below.

The wheel brake cylinders 16 and 19 are connected to the master cylinder 14 via the line 320, which is in hydraulic communication with three lines, i.e. lines 322, 324, and 326. Before the line 320 divides, the flow in the line 320 passes through a proportionally controlled microvalve 325. The line 322 hydraulically connects the line 320 to the wheel brake cylinder 16. The flow path for the line 322 runs through a proportionally controlled 3-way changeover microvalve 327. The line 324 hydraulically connects the line 320 to the wheel brake cylinder 19. The flow path for the line 324 runs through a proportionally controlled 3-way changeover microvalve 329.

The changeover valves 327 and 329 are each configured with a changeover fluid path to an inlet side of the pump 330. An outlet of the pump 330 is connected to the line 326, which includes a conventional attenuator 330a and a conventional orifice 330b. A motor 340 is coupled to the pump 330. Although a single motor 340 has been shown for the pumps 330 and a corresponding pump used in the brake circuit for wheel brake cylinders 18 and 17, separate motors may also be used for each pump.

The fourth embodiment optionally includes pressure transducers 342, 344, and 346 connected on the lines 220, 222, and 224, respectively. The pressure transducers are used to determine the actual fluid pressure at the master cylinder 14 and at the wheel brake cylinders 16 and 19, respectively. A fourth pressure transducer 348, is connected at the point where the line 320 divides into the lines 322, 324, and 326, to determine the pressure at that point. The fourth embodiment also includes an ECU (not shown) coupled to various sensors, including the pressure transducers 342, 344, 346, and 348 and wheel speed sensors (not shown). The ECU is configured to monitor the various sensors and to respond to detected driving conditions by sending control signals which proportionally actuate the microvalves 325, 327, and 329.

Operation of the fourth embodiment of the braking system generally, is as follows. The ECU cycles through various modes in response to detecting an ABS event. The ECU is initially in a normal brake mode. Under certain braking conditions, in which an ABS event is detected, the ECU will enter an ABS control mode to control the pressure applied to the brakes. The ABS control mode includes a controlled dump state, which relieves pressure on the brakes, and a controlled apply state, which builds pressure on the brakes. In the fourth embodiment, the ECU may enter an ABS full dump state to more quickly relieve the pressure at the brakes. If the ABS event is no longer detected, the ECU returns to the normal brake mode.

In the normal brake mode, the pump 330 is turned off, the microvalve 325 is fully open, the changeover microvalve 327 is fully open to the wheel brake cylinder 16, and the changeover microvalve 329 is fully open to the wheel brake cylinder 19. When the driver presses the brake pedal 11, pressure builds from the master cylinder 14 into the line 320. The pressure in the line 320 also builds through the lines 322 and 324 to the wheel brake cylinders 16 and 19, passing through the fully open microvalve 325 and the fully open microvalves 327 and 329.

During a braking condition in which an ABS event is detected (i.e. a slipping wheel), the ABS control mode is entered to control the pressure at the wheel brake cylinders 16 and 19. In ABS control mode, the pressures in the brake lines are detected by the transducers and the microvalves 325, 327, and 329 are proportionally controlled depending on detected braking conditions. For example, the ABS control mode may enter a controlled dump state to relieve pressure at the wheel brake cylinders 16 and 19. In this state, the microvalve 325 is at least partially closed and the microvalves 327 and 329 are at least partially changed over to a restricted flow state so as to reduce the pressure being applied from the master cylinder 14 to the wheel brake cylinders 16 and 19. The pump 330 may be turned on to assist in relieving the pressure. According to the invention, the microvalves 327 and 329 are separately controlled such that the pressures in the lines 322 and 324 may differ from each other depending on the detected braking conditions at the respective wheel brake cylinders 16 and 19.

Also in ABS control mode, it may become desirable to build brake pressure at one or both of the wheel brake cylinders 16 and 19. In this case, the ABS control mode enters a controlled apply state. In order to achieve a controlled apply, the microvalve 325 is at least partially closed and the microvalves 327 and 329 are at least partially closed to restrict the flow from the master cylinder 14 to the wheel brake cylinders 16 and 19. According to the fourth embodiment of the invention, pressure is built even when the pump 330 remains turned on. As noted above, the microvalves 327 and 329 are separately controlled and the pressures in the brake lines may differ from each other depending on the detected braking conditions at the respective wheel brake cylinders 16 and 19.

Depending on the braking conditions detected at each wheel, while in the ABS control mode, the ECU can, for example, relieve pressure from the wheel brake cylinder 16 and simultaneously build pressure at the wheel brake cylinder 19. In this case, the pump 330 would remain on to assist in relieving pressure from the wheel brake cylinder 16. The microvalve 327 would be at least partially changed over to reduce the pressure being applied from the master cylinder 14 to the wheel brake cylinder 16. The microvalve 329 would be at least partially closed so as to restrict flow supplied to the wheel brake cylinder 19. The microvalve 325 would be partially opened or partially closed depending on the pressures detected by the pressure transducers. For example, pressure relieved from the wheel brake cylinder 16 may be applied to the wheel brake cylinder 19. However, if more pressure is required at the wheel brake cylinder 19, the microvalve 325 would be partially opened to apply additional pressure.

In the fourth embodiment, the ECU provides an ABS full mode to quickly relieve the pressure at the wheel brake cylinders 16 and 19. In the ABS full dump mode, the microvalve 325 is fully open and the microvalves 327 and 329 are fully changed over to prevent pressure from the master cylinder 14 from being applied to the wheel brake cylinders 16 and 19. The pump 330 remains turned on to bleed brake fluid from the wheel brake cylinders 16 and 19 back to the master cylinder 14 and thereby relieving brake pressure on the brakes.

Figure 8:
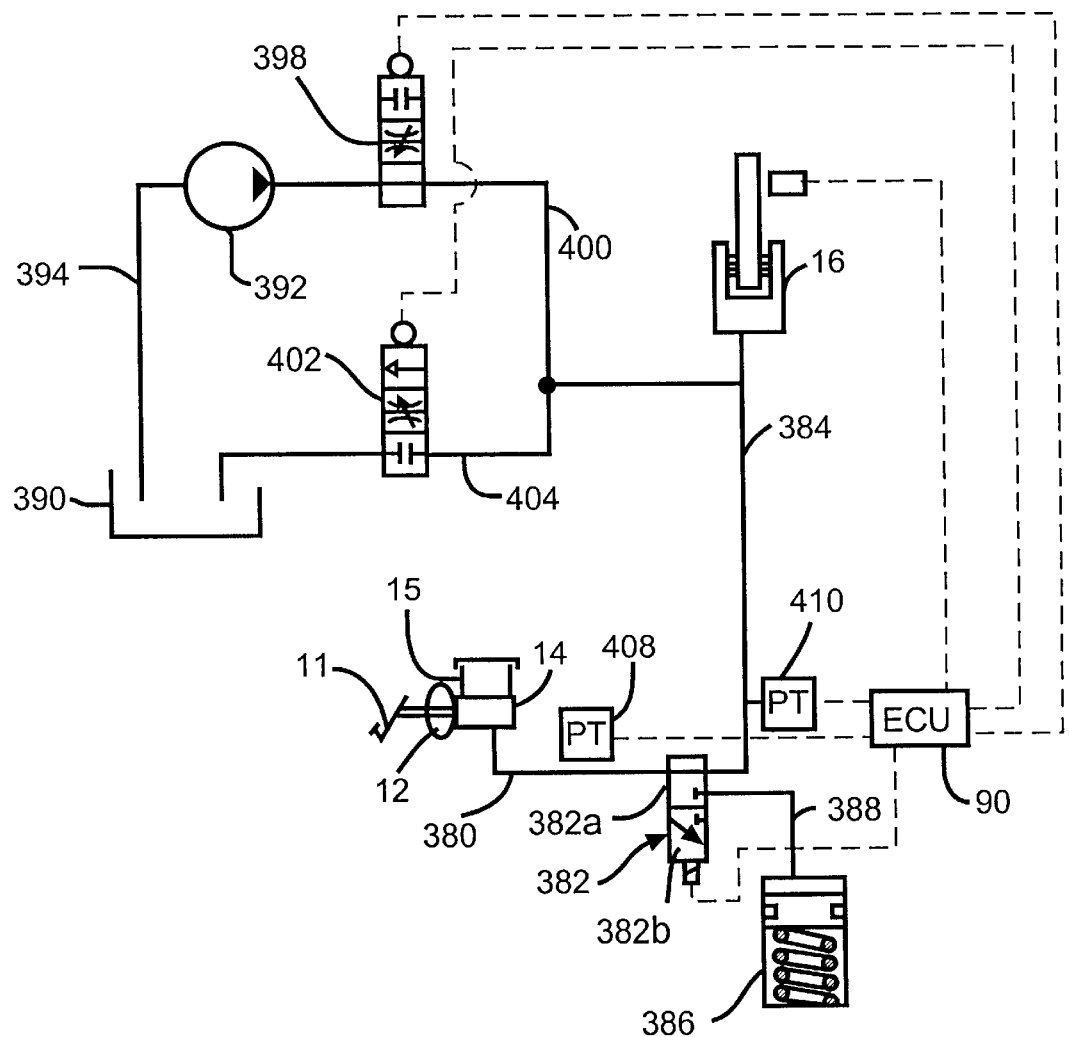
FIG. 8 is a schematic representation of an electronic brake management system according to the invention.

FIG. 8 shows a schematic representation of a fifth embodiment of a hydraulic brake system according to the invention, specifically an embodiment showing an Electronic Brake Management (EBM) brake system. Broadly speaking, and as to be used in interpreting the claims of this application, in an Electro-Hydraulic Brake (EHB) system, the brakes may be actuated by an electrical signal that causes valves in the brake system to operate. In a conventional hydraulic brake system equipped with ABS, Traction Control, or the like, during normal, everyday braking, such as controlled braking on dry pavement, the driver's effort on the brake pedal causes the master cylinder to generate pressurized fluid applied to the vehicle brakes. Only in unusual conditions is the master cylinder isolated from the vehicle brakes, such as when the driver demands too much braking for the road conditions, and excessive wheel slip is detected, resulting in ABS or other electro-hydraulic actuation.

An EHB system is normally defined more narrowly to describe a brake system where, during normal braking, the effort exerted by the driver on a brake pedal (typically measured by force, pedal travel, or a combination thereof) is only used as a signal to an ECU. This narrower type of EHB system is referred to in this application as an EBM brake system. The ECU controls the operation of components such as valves and pumps to apply pressurized brake fluid to the vehicle brakes. In the EBM system that illustrated in FIG. 8, the driver's pedal effort acting on a master cylinder is not the normal source of pressurized fluid applied to the brakes. The ECU will normally isolate the master cylinder from the vehicle brakes, and use another source of pressurized fluid (normally a high pressure accumulator and pump arrangement) to supply pressurized fluid through valves to the brakes. Only in off-normal conditions, such as an electrical failure, will the master cylinder be connected to the brakes. Of course, the EBM system illustrated in FIG. 8 is merely an exemplary EHB system. Various EHB systems are known, such as the EBM system shown in U.S. Pat. No. 5,941,608 to Campau et al., which is incorporated herein by reference, and described below with respect to FIGS. 10–12. According to this invention, microvalves may be substituted for many or all valves in EHB braking systems.

The EBM brake system illustrated in FIG. 8 includes a brake pedal 11 that is connected to a brake booster 12 and a master cylinder 14. The master cylinder 14 is separately connected to two or more similarly arranged brake circuits. For the purpose of description, only the brake circuit for wheel brake cylinder 16 via brake line 380 is discussed below. The brake pedal 11 actuates the master cylinder 14 which pressurizes fluid in the main brake conduit 380 when the driver steps on the brake pedal 11. A brake fluid reservoir 15 holds a supply of brake fluid and is connected to the master cylinder 14 in a known manner. The main conduit 380 connects the master cylinder 14 to a changeover valve 382, which may be implemented as a 2-position, 3-way solenoid-operated valve. Preferably, however, the changeover valve 282 is implemented as a 2-position, 3-way microvalve shown schematically in FIG. 8. A second conduit 384 connects the changeover valve 382 to the wheel brake cylinder 16. The changeover valve 382 has a normal, unactuated position 382a which allows the master cylinder 14 to communicate with the wheel brake cylinder 16. A pressure accumulator which acts as a pedal simulator 386 is connected to the changeover valve 382 via a third conduit 388. The changeover valve 382 has a second, actuated position 382b which connects the master cylinder 14 to the pedal simulator 386 and disconnects the master cylinder 14 from the wheel brake cylinder 16. The master cylinder 14 may act as a backup supply of pressurized hydraulic fluid to the wheel brake cylinder 16.

The braking system shown in FIG. 8 also includes a circuit that provides a normal source of pressurized hydraulic fluid to the wheel brake cylinder 16 during braking conditions. The hydraulic fluid is supplied to the wheel brake cylinder 16 from a tank 390. A pump 392 is hydraulically connected to the tank 390 through a line 394. A first proportionally controlled microvalve 398 is provided on a line 400 between the pump 392 and the wheel brake cylinder 16. A second microvalve 402 is provided on a line 404 which connects the line 400 to the tank 390. The embodiment illustrated in FIG. 8 optionally includes pressure transducers 408 and 410 connected on the lines 380 and 384, respectively. The pressure transducers are used to determine the actual fluid pressure at the master cylinder 14 and the wheel brake cylinder 16, respectively.

During normal braking, the driver applies the brakes by stepping on the brake pedal 11, which causes the master cylinder 14 to pressurize the fluid in conduit 380. This action causes an initial percentage of fluid pressure to be applied to the brake piston. The pressure sensor 408 signals the ECU 90, which actuates the valve 382 to the position 382b, thereby disconnecting the master cylinder 14 from the wheel brake cylinder 16. Alternatively, a pedal travel sensor (not shown) may be used to detect the initial movement of the brake pedal from the brake pedal's fully released position toward an applied position, and generate a signal to the ECU 90 to actuate the valve 382 to the position 382b, disconnecting the master cylinder 14 from the wheel brake cylinder 16 before any detectable pressure increase occurs. The actuated changeover valve 382 connects the master cylinder 14 to the pedal simulator 386. As the driver presses the brake pedal 11, the pedal simulator 386 receives the pressurized fluid generated by the master cylinder 14 and provides a progressively increasing load against the master cylinder 14 to create the "pedal feel". As discussed above in the discussion of FIG. 5a, an advantage of micro-machined technology is the opportunity to integrate microvalves and pressure transducers in a single chip. This may prove especially advantageous in EHB systems, where pedal effort may be measured by measuring the pressure in the pedal simulator or the fluid conduit connecting the pedal simulator to the master cylinder, as here where the pressure measured by the sensor 408 is used in developing a brake demand signal for use by the ECU in controlling braking. Any or all of the pressure sensors 408 and 410, and the microvalves 398 and 402 may be fabricated together from the same silicon chip (which chip may consist of multiple layers of silicon bonded together) to achieve a very compact hydraulic package.

Based on this brake demand signal, the ECU 90 provides a control signal to the microvalves 398 and 402 that causes pressurized fluid to be supplied to the wheel brake cylinder 16. Using pressure information from sensors 410, the ECU 90 can control the operation of the microvalves 398 and 402 to generate the same fluid pressure at the wheel brake cylinder 16 that is conventionally produced by the master cylinder 14. When the driver steps off the brake pedal 11, the master cylinder 14 no longer pressurizes the brake fluid and the excess fluid in the pedal simulator 386 flows back to the master cylinder reservoir 15. The ECU 90 receives the pressure signal from the sensor 408 indicating a reduction in pressure by the master cylinder 14 and control the microvalves 398 and 402 so as to release the brake at the wheel brake cylinder 16, e.g. by closing the microvalve 398 and opening the microvalve 402 to relieve pressure at the wheel brake cylinder 16 back to the tank 390. The changeover valve 382 is then deactuated to position 382a.

Figure 9:
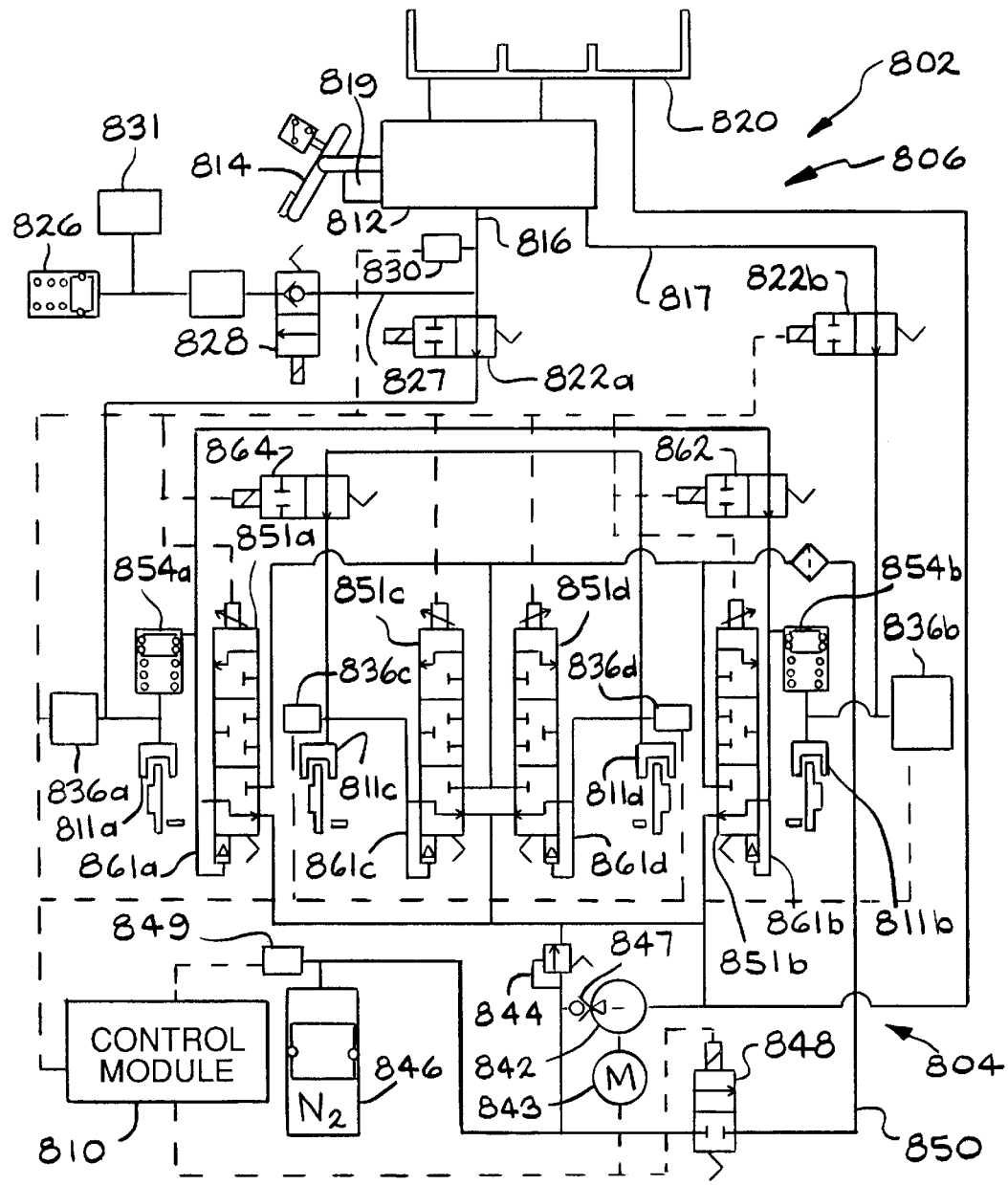
FIG. 9 is a schematic representation of a second electronic brake management system according to the invention.

FIG. 9 is a schematic diagram of another exemplary EHB system, indicated generally at 802, as illustrated and described in U.S. Pat. No. 5,941,608, the disclosure of which was incorporated by reference above. The EHB system 802 is an EBM system as defined above. The brake system 802 may suitably be used on a ground vehicle such as an automotive vehicle having four wheels and a brake for each wheel. The brake system 802 includes a normal source of pressurized hydraulic brake fluid, indicated at 804, and a backup source of pressurized hydraulic brake fluid, indicated at 804. The normal source 804 includes an electronic control module 810. The control module 810, as will be discussed below, receives various signals, processes these signals, and controls the operation of various components of the brake system 802 based on these signals. In this manner, the control module 810 causes the normal source 804 to cooperate with a portion of the hydraulic circuitry of the backup source 804 to provide hydraulic brake fluid at electronically controlled pressures to four vehicle brakes 811a, b, c, and d. The vehicle brakes 811a, b, c, and d each include a respective brake actuation member (such as a slave cylinder) and friction member actuatable by the actuation member for engaging a rotatable braking surface of the vehicle wheel. The backup source 804 provides for manual backup braking for, preferably, two of the vehicle brakes 811a and 811b, as will be discussed in detail below.

The source of pressurized hydraulic brake fluid for the backup source 804 is a manually operated master cylinder 812. The master cylinder 812 is operated by a brake pedal 814 to supply pressurized hydraulic brake fluid to a first manual backup brake circuit via a conduit 816 and a second manual backup brake circuit via a conduit 817. The brake pedal 814 is preferably coupled to a displacement transducer 819 producing a signal indicative of how far the brake pedal 814 is depressed, which is indicative of brake demand by the operator, which signal can be an input to the control module 810. A reservoir 820 is provided which communicates with the first and second brake circuits through the master cylinder 812 in the ordinary manner.

The conduit 816 is connected via a first electrically operated isolation valve 822a with a first hydraulically operated vehicle brake 811a. The conduit 817 is connected via a second electrically operated isolation valve 822b with a second hydraulically operated vehicle brake 811b. When an isolation valve 822a or 822b is electrically de-energized, the valve is open, as shown in FIG. 9, allowing pressurized brake fluid from the master cylinder 812 to be applied to the associated vehicle brake 811a or 811b to brake the vehicle. In normal operation, the isolation valves 822a and 822b are deenergized open when no braking is occurring. The isolation valves 822a and 822b are energized shut during vehicle braking, isolating the master cylinder 812 from the vehicle brakes 811a and 811b. In this condition, the pressurized brake fluid developed in the master cylinder 812 is routed instead to a pedal simulator 826 via a conduit 827. Located in the conduit 827 is a simulator valve 828 for selectively allowing the passage of fluid flowing into and out of the pedal simulator 826. When the isolation valves 822a and 822b are energized shut, the simulator valve 828 is energized open. When the isolation valves 822a and 822b are deenergized open, the simulator valve 828 is deenergized shut. The isolation valves 822a and 822b and the simulator valve 828 may be pulse width modulated to electronically command the operation of the valves.

The pedal simulator,26 is typically an arrangement of a spring-loaded piston within a cylinder. The pedal simulator 826 is connected to the conduit 816 so that when the brake pedal 814 is depressed, pressurized brake fluid from the master cylinder 812 is directed through the conduit 816 to the pedal simulator 826 to drive the pedal simulator piston to compress the pedal simulator spring.

As the spring of the pedal simulator 826 exerts greater resistance, pressure in the conduit 816 is increased due to the resistance to further movement by the spring-loaded pedal simulator piston. This resistance to movement is fed back to the pedal 814 through the increased pressure of the conduit 816 reacting in the master cylinder 812, so that the operator of the brake pedal feels an increasing resistance as the brake pedal 814 is depressed, similar to the resistance felt when the master cylinder 812 is hydraulically coupled to the vehicle brakes 811a and 811b.

The pressure in the conduit 816 between the master cylinder 812 and the isolation valve 822a is monitored by a pressure transducer 830 which supplies a signal representative of the sensed pressure to the control module 810 as a brake demand signal. Note that the signal from the brake pedal displacement transducer 819 may be used instead of the pressure signal from the pressure transducer 830 as the brake demand signal, or may be used as a backup or check signal to verify proper operation of the pressure transducer 830. If desired, the pressure in the conduit 817 can also be monitored by a pressure transducer (not shown).

Preferably, however, the displacement signal from the pedal transducer 819 and the pressure signal from the pressure transducer 830 are blended together in a suitable fashion to create a system brake demand signal.

As the operator of the vehicle depresses the brake pedal 814, the master cylinder 812 is actuated, thereby causing an increase in pressure within the conduits 816 and 817. The increased pressure within the conduit 816 compresses the spring of the pedal simulator 826, and the pressure transducer 830 senses the pressure in the conduit 816. The pedal simulator 826 is provided so that the operator of the vehicle experiences a consistent pedal feel, whether or not the isolation valves 822a and 822b are closed. It is also contemplated that the simulator valve 828 may be omitted.

The pressure in the conduits 816 and 817 between each isolation valve 822a and 822b, and the respective vehicle brake 811a and 811b, is sensed by respective pressure transducers 836a and 836b, which supply signals representative of the respective sensed pressures to the control module 810. The control module 810 utilizes the pressure signals produced by the pressure transducers 836a and 836b for purposes that will be described below. As also will be further described below, the control module 810 controls the operation of the simulator valve 828 and the isolation valves 822a and 822b.

As indicated above, the isolation valves 822a and 822b are energized and shut during normal operation of the brake system 802. Only in an abnormal situation, such as a loss of electrical power, will the isolation valves 822a and 822b remain open after the driver initiates a brake demand signal by depressing the brake pedal 814. In such a situation, the master cylinder 812 acts to supply pressurized hydraulic brake fluid to the vehicle brakes 811a and 811b through the open isolation valves 822a and 822b. However, absent some type of failure, the normal source 804 should supply pressurized hydraulic brake fluid for actuating the vehicle brakes 811a, b, c, and d.

The normal source 804 includes a pump 842 which is capable of pumping hydraulic brake fluid from the reservoir 820 to actuate the vehicle brakes 811a, b, c, and d. A motor 843 under the control of the control module 810 preferably electrically drives the pump 842.

Pressurized hydraulic brake fluid from the pump 842 is supplied to a high-pressure accumulator 846 through a check valve 847. The check valve 847 allows brake fluid to flow from the discharge of the pump 842 and restricts brake fluid from flowing into the pump 842 through the discharge port. The accumulator 846 contains a reservoir of hydraulic brake fluid which is pressurized by the piston under the influence of the compressed nitrogen gas, which may be used to actuate the vehicle brakes 811a, b, c, and d whether or not the pump 842 is running. The pressure of the hydraulic brake fluid in the accumulator 846 is sensed by a pressure transducer 849, which supplies a corresponding signal to the control module 810.

The normal source 804 also includes a pressure isolation valve 848. The pressure isolation valve 848 is controlled by the control module 810 to move between a de-energized position in which pressurized brake fluid in the accumulator 846 is prevented from discharging from the accumulator 846, and an energized position in which pressurized brake fluid can flow out of the accumulator 846. The pressure isolation valve 848 will normally be deenergized closed to prevent discharge of the accumulator 846 due to system leakage past various other system valves. Note that a high-pressure relief valve 844 and the check valve 847 cooperate with the pressure isolation valve 848 to prevent the fluid within the accumulator 846 from discharging when the pressure isolation valve 848 is shut. When braking is required, the pressure isolation valve 848 is energized open to allow the pressurized hydraulic brake fluid in the accumulator 846 to be used to apply the vehicle brakes 811a, b, c, and d. The location of the pressure isolation valve 848 in the brake system 802 provides for over-pressure protection for the accumulator 846 by the relief valve 844.

Through the pressure isolation valve 848, the outlet of the pump 842 and the accumulator 846 are in fluid communication with a fluid conduit 850. The fluid conduit 850 is in fluid communication with proportional control valves 851a, b, c, and d.

The illustrated proportional control valve 851a has a port that is in fluid communication with a fluid separator unit 854a. The fluid separator unit 854a comprises a spring-loaded piston within a cylinder. In the fluid separator unit 854a, pressurized fluid from the backup source 804 actuates the piston of the fluid separator unit 854a to pressurize the trapped hydraulic brake fluid between the isolation valve 822a and the wheel brake 811a to substantially the same pressure as the pressure at which the hydraulic brake fluid is supplied to the fluid separator unit 854a from the backup source 804. Any differences due to the compression of the spring of the fluid separator unit 854a and friction are generally negligible fractions of the pressures of the hydraulic brake fluid acting in the fluid separator unit 854a during braking.

The fluid separator unit 854a permits pressure in the hydraulic brake fluid on one side of the piston (acting on one of the first and second working faces of the piston) to be transferred to the hydraulic brake fluid on the other side of the fluid separator piston (acting on the other of the first and second working faces of the piston) through movement of the fluid separator piston. The fluid separator unit prevents intermixing of the hydraulic brake fluids on either side of the fluid separator unit. As will become apparent, a primary purpose of the fluid separator unit 854a is to maintain the integrity and operability of the backup source 804 of hydraulic brake fluid even in the event of a malfunction or rupture of the normal source 804.

The fluid separator piston is constrained to remain in the bore of the fluid separator unit 854a, and thus a complete loss of hydraulic brake fluid and pressure on one side of the piston of the fluid separator unit 854a will not result in loss of fluid or complete loss of pressure on the other side of the fluid separator piston. As pressurized hydraulic brake fluid flows into the fluid separator unit 854a from the proportional control valve 851a, the fluid separator piston is moved to an actuated position, compressing the spring of the fluid separator. The piston acts to pressurizing the hydraulic brake fluid trapped between the energized isolation valve 822a and the vehicle brake 811a and causing the vehicle brake 811a to be applied.

The normal source 804 also includes a fluid separator unit 854b connected (in an arrangement similar to that of the fluid separator unit 854a, the control valve 851a and the brake 811a) between the control valve 851b and the vehicle brake 811b. The fluid separator unit 854b is similar in construction and operation to the fluid separator unit 854a.

The control module 810 electrically positions each of the proportional control valves 851a, b, c, and d. In a first energized position, the apply position, the proportional control valve 851a or b directs the pressurized hydraulic brake fluid supplied to the proportional control valve 851a or 851b from the fluid conduit 850 to the associated fluid separator unit 854a or 854b. In a second energized position, the maintain position, the proportional control valve 851a or 851b closes off the port thereof which is in communication with the associated fluid separator unit 854a or 854b, thereby hydraulically locking the associated fluid separator piston of the fluid separator unit 854a or 854b in a selected position. In a de-energized position, the release position, the spool of the proportional control valve 851a or 851b is moved by a spring to the position illustrated in FIG. 9, where the proportional control valve 851a or 851b provides fluid communication between the associated fluid separator unit 854a or 854b and the reservoir 820. This vents pressure from the associated fluid separator unit 854a or 854b, allowing the piston thereof to move back to the unactuated position thereof under the urging of the associated spring, thereby reducing pressure at the associated vehicle brake 811a or 811b. The proportional control valves 851c and 851d generally operate in the same manner as the proportional control valves 851a and 851b, except that there is not a fluid separator unit positioned between the proportional control valves 851c and 851d and the respective vehicle brakes 811c and 811d since the backup source 804 does not supply the vehicle brakes 811c and 811d. The pressures in the conduits between each proportional control valve 851c and 851d, and the respective vehicle brake 811c and 811d, is sensed by respective pressure transducers 836c and 836d, which supply signals representative of the respective sensed pressures to the control module 810.

Preferably, the positions of the proportional control valves 851a, b, c, and d are controlled so that the controlled pressures are proportional to the current of the energizing electrical signal. The controlled pressure for the proportional control valves 851a or 851b is the fluid pressure in the fluid conduit between the respective proportional control valve 851a or 851b and the associated fluid separator unit 854a or 854b. The controlled pressure for the proportional control valves 851c or 851d is the fluid pressure in the fluid conduit between the respective proportional control valve 851c or 851d and the associated vehicle brake 811c or 811d. A respective pressure feedback conduit 861a, b, c, or d is provided to the associated proportional control valve 851a, b, c, or d, so that controlled pressure opposes the movement caused in the proportional control valve 851a, b, c, or d caused by increasing energization of the solenoid thereof.

It may be desirable, however, to control the position of the proportional control valves 851a, b, c, and d, such that the exact position of a proportional control valve 851a, b, c, or d is proportional to the energizing electrical signal from the control module 810. Thus, the proportional control valves 851a, b, c, or d may be positioned at an infinite number of positions rather than just the three positions described above. In other words, the proportional valves 851a, b, c, or d may be positioned in the apply position, the maintain position, or the release position; the proportional valves 851a, b, c, or d may also be positioned to any position between the apply and maintain position to provide a throttled path for directing the pressurized hydraulic brake fluid to the associated fluid separator unit 854a, b, c, or d; and the proportional valves 851a, b, c, or d may be positioned to any position between the release position and the maintain position to provide a throttled path for venting the pressurized hydraulic brake fluid from the associated fluid separator unit 854a, b, c, or d to the reservoir 820. If it is desired to rapidly apply pressurized hydraulic brake fluid to the associated vehicle brake 811a, b, c, or d, the proportional control valve 851a, b, c, or d is moved fully to the first energized (apply) position. However, if it is desired to more slowly apply hydraulic brake fluid to the associated vehicle brake 811a, b, c, or d, the proportional control valve 851a, b, c, or d is moved to a position between the first (apply) and second (maintain) energized positions described above, so that pressurized hydraulic brake fluid can be applied to the associated vehicle brake 811a, b, c, or d at less than the maximum rate possible because the proportional control valve 851a, b, c, or d is throttled. Similarly, the proportional control valve 851a, b, c, or d may be moved to a position between the second (maintain) energized position and the de-energized position to vent pressurized hydraulic brake fluid from the associated vehicle brakes 811a, b, c, or d at less than the rate possible when the proportional control valve 851a, b, c, or d is in the de-energized (release) position.

The brake system 802 further includes a pair of normally open balance valves 862 and 864 that are electrically controlled by the control module 810. The balance valve 862 selectively isolates the fluid communication between the outlet ports of the proportional control valves 851a and 851b. The balance valve 864 selectively isolates the fluid communication between the vehicle brakes 811c and 811d.

During normal braking, the control module 810 maintains the isolation valves 822a and 822b energized shut and the simulator valve 828 energized open, thereby isolating the master cylinder 812 from the vehicle brakes 811a and 811b, and hydraulically connecting the pedal simulator 826 to the master cylinder 812. Fixed volumes of hydraulic brake fluid are trapped between the isolation valve 822a and the vehicle brake 811a, and between the isolation valve 822b and the vehicle brake 811b. The pump 842 is suitably run to cooperate with the accumulator 846 to supply sufficient quantities of pressurized hydraulic brake fluid to meet the brake demand. Generally, the control module 810 shuts off the pump 842 when a sufficient quantity of suitably pressurized hydraulic brake fluid has been generated to meet brake demand. In this manner, the fluid conduit 850 is pressurized up to the proportional control valves 85a, b, c, and d.

In the event that an abnormal loss of pressure in the normal source 804, or other failure of the normal source 804, the control module 810 monitors the pressure transducer 849, 836a, 836b, 836c, 836d and 830 to attempt to determine the extent of the abnormality. Pre-programmed degraded control schemes are preferably programmed into the control module 810. The control module 810 may maintain braking control from the normal source 804 in certain degraded conditions. In certain other conditions, the control module 810 may cause pressurized hydraulic brake fluid for operation of the vehicle brakes 811a and 811b to be supplied from the manual backup source 804, from the master cylinder 812. In this case, the isolation valves 822a and 822b, the simulator valve 828, and the proportional control valves 85a, b, c, and d are deenergized, thereby connecting the vehicle brakes 811a and 811b to the master cylinder 812 for manual control. Note that even a rupture of the fluid conduit 850 of the normal source 804, and a complete draining of hydraulic brake fluid from the normal source 804, will not prevent the operation of the vehicle brakes 811a and 811b by the master cylinder 812, since the fluid separator units 854a and 854b will prevent any loss of hydraulic brake fluid from the conduit 816 or the conduit 817 of the backup source 804 to the piping of the normal source 804.

During normal braking, however, with the normal source 804 available, the operator of the vehicle generates a manual brake demand signal by depressing the brake pedal 814. Depressing the brake pedal 814 sends pressurized hydraulic brake fluid to the pedal simulator 826. The pressure of the hydraulic brake fluid in the pedal simulator 826 increases as the brake pedal 814 is further depressed, owing to further compression of the spring 826e of the pedal simulator 826. The pressure transducer 830 monitors the resultant rise in pressure in the conduit 816. As indicated above, the output signal of the pressure transducer 830 is a brake demand signal sent to the control module 810. The more the brake pedal 814 is depressed, the greater the brake demand signal developed by the pressure transducer 830. Similarly, the more the brake pedal 814 is depressed, the greater the brake demand signal generated by the brake pedal displacement transducer 819 which is sent to the control module 810. As described above, the brake demand signals generated by the displacement transducer 819 and the pressure transducer 830 are combined to generate a system brake demand signal.

Various automated brake demand signals and brake modulation signals may be supplied to the control module 810. For example, it may be desired to actuate one or more of the vehicle brakes 811a, b, c, and d for purposes of traction control, coordinated vehicle stability control, hill hold, or automated collision avoidance control schemes, even when the vehicle operator is not depressing the brake pedal 814. Similarly, it may be desired to temporarily decrease the braking force of one or more of the vehicle brakes 811a, b, c, and d for the purposes of antilock braking even if the operator is depressing the brake pedal 814. Signals which may be supplied to the control module 810 for the purposes of such automated control schemes may include wheel speed of each of the vehicle's wheels, vehicle deceleration, steering angle, vehicle yaw rate, vehicle speed, vehicle roll rate, and signals from radar, infrared, ultrasonic, or similar collision avoidance systems, cruise control systems (including AICC—Autonomous Intelligent Cruise Control Systems), and the like. It may also be desirable to actuate one or more of the vehicle brakes 811a, b, c, and d for purposes of panic brake assist when the vehicle operator is depressing the brake pedal 814.

When braking is demanded at one or more of the vehicle brakes 811a, b, c, and d, the pressure isolation valve 848 is opened, and the appropriate proportional control valve(s) 851a, b, c, and d are energized to an apply position. The balance valves 862 and 864 are normally actuated to a closed position during braking, thereby isolating the vehicle brakes 811a, b, c, and d from each other. For the vehicle brakes 811a and 811b, pressurized hydraulic brake fluid from the normal source 804 is applied to the fluid separator piston(s) of the respective fluid separator unit(s) 854a and 854b, causing the fluid separator piston(s) to move toward the second end 855c of the bore 855a, compressing the spring, and forcing pressurized hydraulic brake fluid out of the second end 855c of the fluid separator unit(s) 854a and 854b. Since there is already a trapped volume of hydraulic brake fluid between the vehicle brakes 811a and 811b and the associated isolation valve 822a and 822b, the pressurized hydraulic brake fluid from the fluid separator unit(s) 854a and 854b causes the associated vehicle brake(s) 811a and 811b to be applied. Since there are no fluid separator units associated with the vehicle brakes 811c and 811d, pressurized hydraulic brake fluid from the proportional control valves 851c and 851d, respectively, is applied to the associated vehicle brakes 811c and 811d. Of course, fluid separator units could suitably be added between the proportional control valves 851c and 851d and the associated vehicle brakes 811c and 811d together with selective fluid communication with the master cylinder 812 if it is desired to provide manual braking to the rear vehicle brakes 811c and 811d.

The pressure of the hydraulic brake fluid applied to the vehicle brakes 811a, b, c, and d is monitored by the associated pressure transducers 836a, b, c, and d. When a desired brake pressure is reached in a vehicle brake 811a, b, c, or d, the control module 810 will cause the associated proportional control valve 851a, b, c, or d to move to the maintain position, to hold the desired pressure. If the accumulator 846 is unable to supply sufficient pressure and volume of pressurized hydraulic brake fluid to the proportional control valves 85a, b, c, and d, the pump 842 is started to supply the needed pressurized hydraulic brake fluid.

When the pressure at the vehicle brake 811a, b, c, or d is no longer the desired pressure, the control module 810 will position the associated proportional control valve 851a, b, c, or d to apply more pressurized fluid to increase the pressure applied, or to vent pressurized brake fluid to the reservoir 820 to decrease or release the pressure applied, as appropriate, in response to the varying brake and modulation demand signals and the control scheme programmed into the control module 810.

It should be noted that many of the components described and illustrated as discrete components may be easily combined in a single compact housing. For example, the master cylinder 812, the isolation valves 822a and 822b, the simulator valve 828, the pedal simulator 826 and one or more travel transducers and one or more pressure transducers 830, could be integrated into one unit with or without the reservoir 820 included therein. Similarly, the fluid separator units 854a and 854b, the proportional control valves 851a, b, c, and d, the balance valves 862 and 864, and the pressure transducers 836a, b, c, and d could be integrated into a single unit. The accumulator 846, the pressure isolation valve 848, the pump 842 with motor, and the pressure transducer 849 could be incorporated into one unit. The control module 810 (also known as an ECU—Electronic Control Unit) could be integrated into the unit containing the pump 842. Indeed, it is contemplated that any or all of the components discussed in this paragraph could be highly integrated into one unit.

In accordance with the invention, it is contemplated that microvalves may be utilized as the isolation valves 822a and 822b, the simulator valve 828, the proportional control valves 851a, b, c, and d, the balance valves 862 and 864, and the pressure isolation valve 848. Indeed, as indicated above, in accordance with the invention, it is contemplated that microvalves may be utilized for any electrically operated valve in any Electro-Hydraulic Braking system, or any automotive braking system using electrically operated valves. Additionally, it is contemplated that any pressure transducer in any braking system may be micro-machined pressure transducers, and may advantageously be integrally fabricated in the same body as one or more microvalves. Specifically, any of the pressure transducer 849, the pressure transducers 836a–d; and the pressure transducers 830 may be micro-machined pressure transducers. Advantageously, any suitable arrangement of micro-machined pressure transducers, microvalves, or combinations of micromachined pressure transducers and microvalves may be fabricated on the same silicon chip (i.e., integrally formed). Indeed, it is contemplated that other electronic and electromechanical devices useful in vehicle braking systems may also be integrally formed with microvalves or micromachined pressure transducers, such as accelerometers and yaw-rate sensors.

In addition to the braking systems described above, one or more microvalves could be employed in an Electronically Controlled Hydraulic Boost braking system (ECHB). In a conventional hydraulic vehicle brake system, the braking force developed by the system is generally proportional to the force applied by the vehicle operator on a vehicle brake pedal. The pedal is linked to the piston in the master cylinder, which moves to pressurize the fluid of the brake system, and thus actuate the individual wheel brakes. Generally, in order to provide a sufficiently high pressure to operate the wheel brakes without requiring an excessive effort by the operator, most vehicles include a "boosted" power brake system wherein the force applied to the brake pedal by the operator is amplified or boosted before being applied to the master cylinder. Typically, this is accomplished by incorporating either a vacuum or hydraulically operated boost piston assembly to act on the linkage between the brake pedal and the master cylinder.

In an ECHB braking system, a sensor senses the brake demand of the driver, for example, by monitoring one or both of the movement of the brake pedal by the driver and the brake pedal force exerted by the driver. The driver's brake demand signal is supplied to an electronic controller (not shown). The electronic controller, like the ECU 90, may also be supplied by brake demand signals which are not driver demanded, but come from other Systems such as hill hold, collision avoidance, intelligent cruise control, automatic guidance systems and the like. In turn, in a hydraulic boost system, the electronic controller controls a demand signal to a pressure control valve (not shown). This pressure control valve regulates the pressure of the brake fluid supplied from source of high pressure fluid to a brake boost piston (not shown). The brake boost piston when supplied with high pressure fluid, assist the driver in actuating the master cylinder. The amount of boost is controlled by the pressure control valve, which in turn, is controlled as described above, by the electronic controller. In this type of braking system according to the invention, a microvalve may be used as the pressure control valve so as to reduce packaging size, reduce power consumption and improve reliability.

An article entitled "A Silicon Microvalve For The Proportional Control Of Fluids" by K. R. Williams, N. I. Maluf, E. N. Fuller, R. J. Barron, D. P. Jaeggi, and B. P. van Drie enhuizen, TRANSDUCERS '99, Proc. $10^{th}$ International Conference on Solid State Sensors and Actuators, held Jun. 7–10, 1999, Sendai, JAPAN, pp. 18–21, the disclosure of which is hereby incorporated by reference, describes a micro-machined plate valve with pressure-force balancing for operation at elevated pressures. The valve can proportionally control the flow of both gasses and liquids. Due to its structure, it can be configured as normally open or normally closed. A thermal actuator with a mechanical linkage drives the valves. The chip is almost entirely silicon, eliminating actuation due to mismatch of thermal expansion rates.

Figure 10:
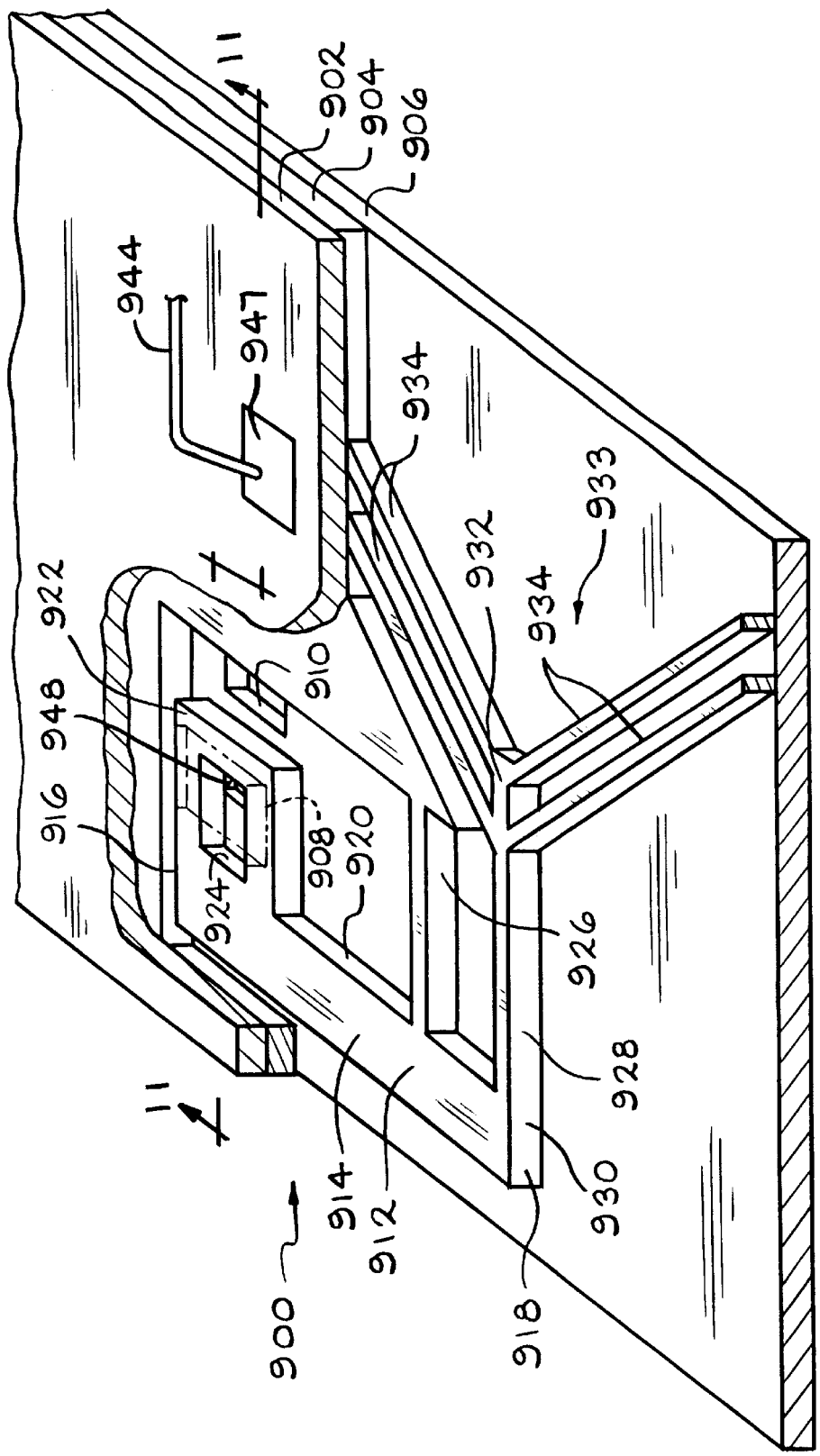
FIG. 10 is a perspective view, partially broken away, of a microvalve device according to the invention.

FIG. 10 is a perspective view (with portions partially broken away) of a microvalve device, specifically a micro-machined plate valve 900, according to this concept. The valve 900 is implemented in three layers of silicon, including a top layer 902, a middle layer 904 and a bottom layer 906. Inlet and outlet ports are formed in the top layer 902, the bottom layer 906, or both. The valve 900 of this example is shown as a normally open valve. In this exemplary embodiment, fluid can flow down therethrough an inlet 908 in the top layer 902, through the thickness of the middle layer 904, and out an outlet 910 in the bottom layer 906. The valve 900 includes a slider 912 which may be moved to selectively block the flow path just described. The slider 912 is formed in the middle layer 904. The slider 912 in this embodiment is implemented as a generally "P-shaped" member, having an elongated shaft 914. The shaft 914 has a first end 916, a second end 918, and a side 920. A generally rectangular plate 922 is fixed to the side 920 of the shaft 914, at the first end 916 of the shaft 914. The plate 922 defines a generally rectangular central bore 924 therethrough, the purpose of which will be explained below. The shaft 914 is flexibly mounted to fixed portions of the middle layer 904 by a bendable "fixed pushrod" 926. The fixed pushrod 926 is fixed to the side 920 at a position between the first end 916 and the second end 918. A movable pushrod 928 is fixed at a first end 930 of the movable pushrod 928 to the side 920 at a position spaced apart from the attachment point of the fixed pushrod 926. In the illustrated embodiment, the movable pushrod 928 is fixed to the side 920 at the second end 918 of the shaft 914. A second end 932 of the movable pushrod 928 forms a part of a micro-machined valve actuator 933. The valve actuator 933 includes a plurality of flexible ribs 934 arranged in a chevron, fixed at first ends thereof to the movable pushrod 928, and at second ends (not shown) thereof to fixed portions of the middle layer 904. While the ribs 934 are shown as linear members, they may be of any suitable shape, including arched.

Electrical current flowing through the ribs 934, which causes the ribs 934 to heat and expand, activates the actuator 933. The ribs 934 push the movable pushrod 928 to the left (as viewed in FIG. 10), applying a torque to the slider 912. The first end of the shaft 914 moves to the right (as viewed in FIG. 10), obstructing the flow path from the inlet port 908 to the outlet port 910, and blocking flow of fluid through the valve 900. The temperature rise of the ribs 934 relative to the rest of the chip containing the valve 900, to which the ribs 934 are attached, can be continuously varied with input heating power, the slider position relative to the inlet port 908 and the outlet port 910 can be varied, allowing proportional control (i.e., the flow rate varies continuously with the input signal controlling the heating of the ribs 934).

The actuator 933 produces a relatively large amount of force (for a microvalve actuator) over a relatively small displacement. This relatively small displacement is transformed into a larger displacement using the principals of a lever. Rather than using a mechanical pivot point, a flexure structure is used. The fixed pushrod 926 serves as the pivot point for the lever formed by the shaft 914. After accounting for loss in the pushrods, the unloaded displacement of the first end 916 is approximately equal to the displacement of the actuator 933 times the lever ratio (the distance between the point of attachment of the fixed pushrod 926 and the first end 916 divided by the distance between the point of attachment of the movable pushrod 918 and the point of attachment of the fixed pushrod 926) of the shaft 914.

Figure 11:
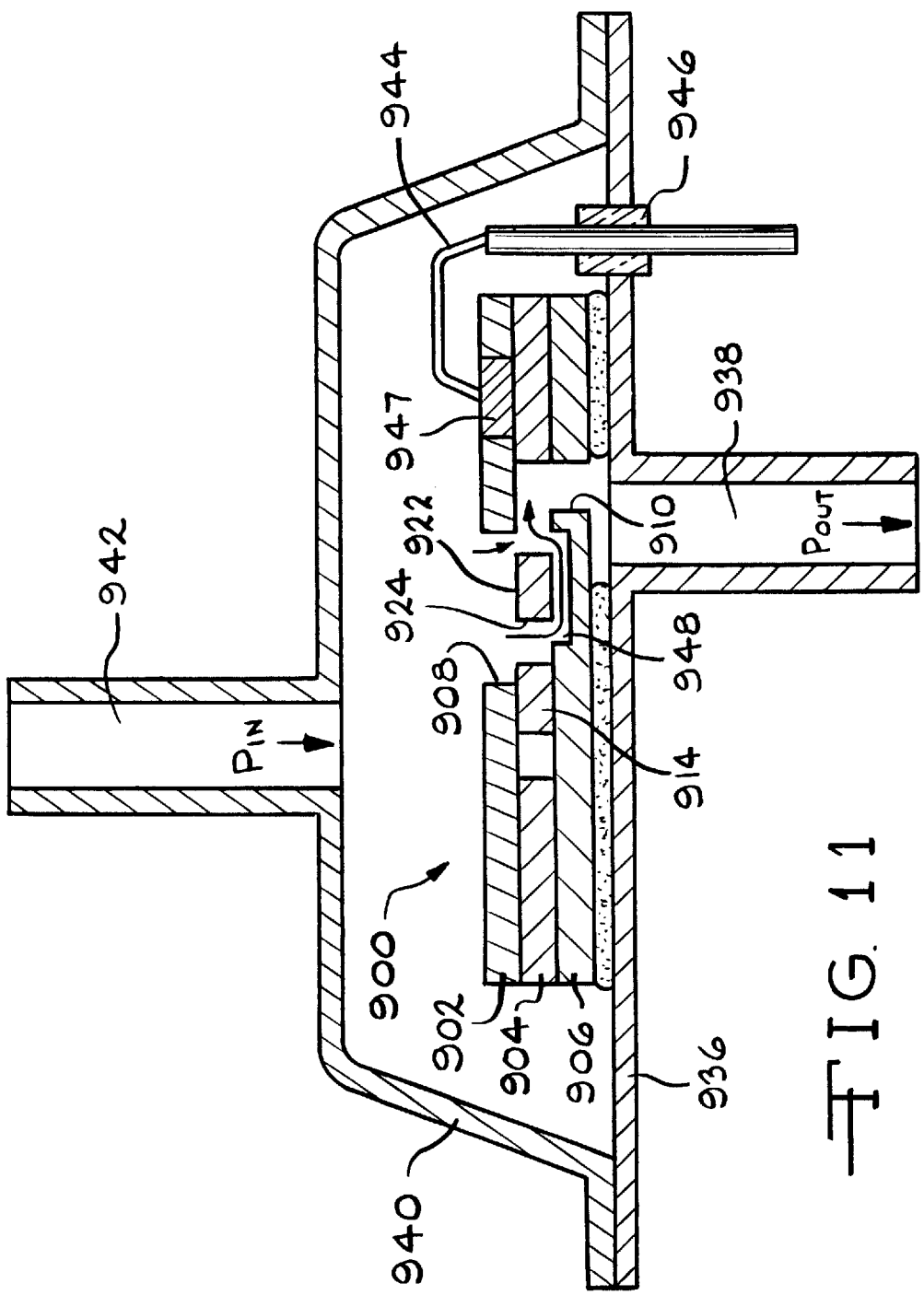
FIG. 11 is a view taken along the line 11—11 of FIG. 10.

Fluid flow enters the valve 900 through the inlet port 908 in the top layer 902 and leaves through the outlet port 910 in the bottom layer 906. The valve 900 in the illustrated embodiment is mounted on a header 936, as shown in FIG. 11. The header 936 is provided with a passage 938 providing fluid connection between the outlet port 910 and another portion of a brake circuit. The packaging for the valve 900 can thus be relatively simple packaging, such as a modified TO-8 header. A lid 940 is bonded to the header 936 to enclose the valve 900. An inlet passage 942 connects the space enclosed by the lid 940 with a portion of the brake circuit providing pressurized fluid. The valve 900 is thus held in compression against the header 936 when the inlet passage 942 is pressurized higher than the passage 938 in the header 936. If the valve 900 is not to be subjected to significant reverse differential pressures (i.e., the passage 938 in the header 936 at a significantly higher pressure than the pressure in the inlet passage 942), then the valve 900 may be secured to the header 936 with a relatively weak bond. It is contemplated that the valve 900 may be attached to the header 936 with an adhesive such as RTV. Of course, any suitable attachment method may be used, which may vary based on the application in which the valve 900 is to be used in a brake system, including the use of mechanical fasteners or solder to attach the valve 900 to the header 936.

Electrical leads 944 (only one of which is shown) are connected so as to be able to induce electrical current flow through the ribs 934 when a voltage is applied to the electrical leads 944. A glass seal 946 may be used to provide a pressure seal between each of the leads 944 and the header 936. Each leads 944 may be soldered to a respective bond pad 947 on either side of the actuator 933, adjacent the ribs 934, or otherwise securely electrically and mechanically connected to the valve 900 so as to be able to conduct the current flow through the ribs 934 to heat the ribs 934 when the actuator 933 is actuated.

In micro-machined seat valves, such as the type described above with respect to FIG. 2, the valve must work against the force of a pressure difference acting over the orifice area. In the plate valve design, however, the static pressure forces can be balanced, as will now be described with reference to FIG. 12. The open rectangular plate 922 is positioned so that the inlet pressure $P_{in}$ acts on opposing surfaces of the rectangular bore 924 therethrough, balancing the static forces due to the inlet pressure. The outlet pressure $P_{out}$ is allowed to surround the outside surfaces of the rectangular plate 922 and the shaft 914 so that $P_{out}$ also acts on opposing surface, balancing the static forces. The slider 912 is also pressure-force-balanced in the vertical direction by the formation of a cavity 948 under the leading edge of the slider 912. This also allows flow past the slider 912 to the outlet 910, when the valve is partially or fully opened, over the top of the slider 912 through a controlling orifice 949a and under the bottom of the leading edge of the slider 912 through a controlling orifice 949b. The controlling orifice 949a and the controlling orifice 949b will be of equal size to help balance the vertical pressures acting on the slider 912. Without this balancing, friction due to forces pushing down on the slider 912 can become significant.

Figure 12:
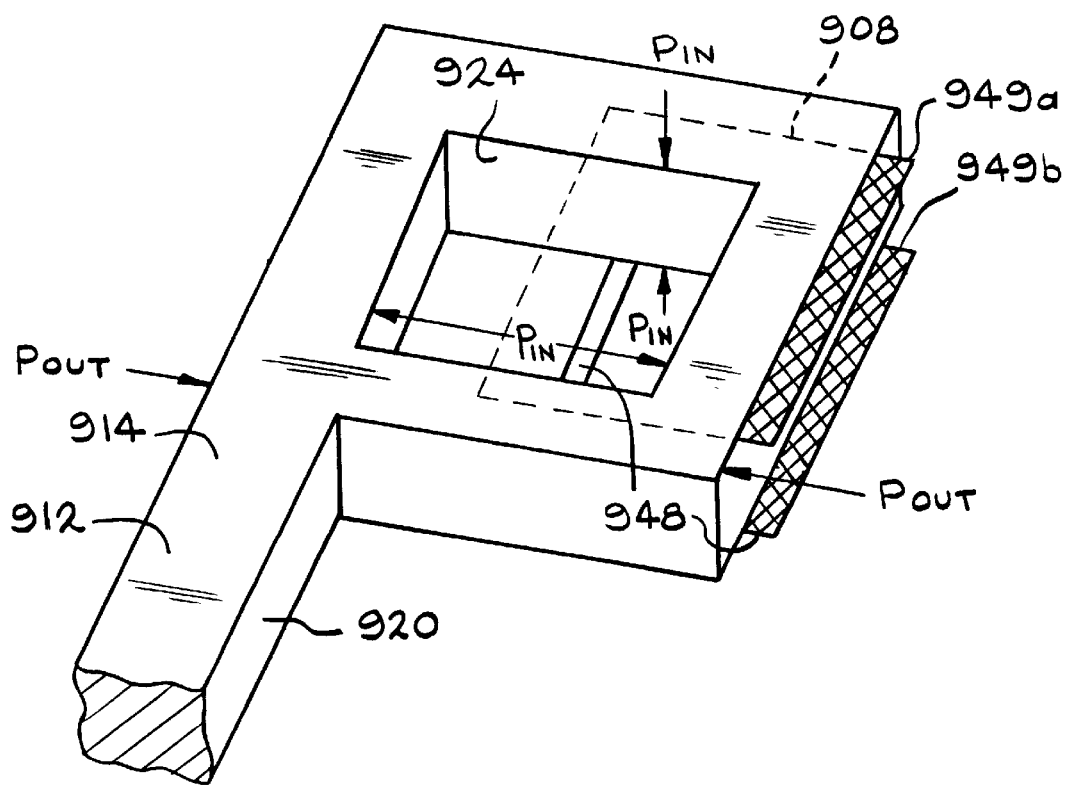
FIG. 12 is an enlarged view of a portion of the microvalve shown in FIG. 10.
Figure 13:
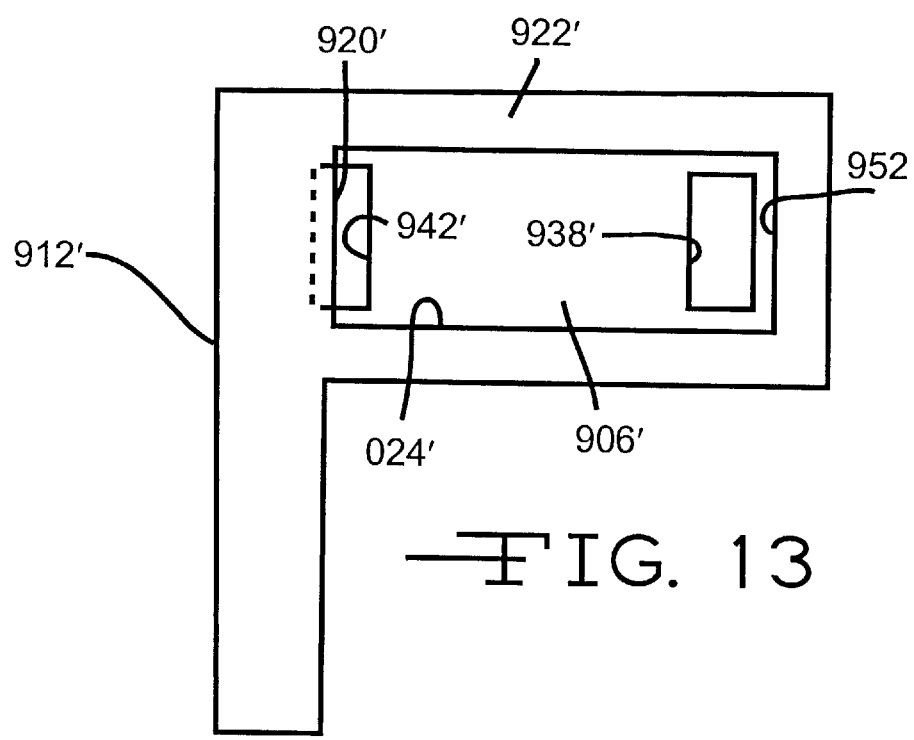
FIG. 13 is a plan view of an alternate embodiment of the microvalve shown in FIGS. 10–12.

FIG. 13 shows a modification of the construction shown in FIGS. 10–12. Corresponding parts are indicated by the same reference characters as in FIGS. 10–12, but with a prime appended. Instead of a single inlet port 942 and a single outlet port 938, the valve 900' has a pair of opposing inlet ports 942' (only one of which is shown) and a pair of opposing outlet port 938', with one of the inlet ports 942' and one of the outlet ports 938' formed through the top layer (not shown) and the other of the inlet ports 942' and the other of the outlet ports 938' formed through the bottom layer 906'. The rectangular bore 924' partially encircles or encloses both at least a portion of the inlet ports 942' (when the valve 900' is open) and at least a portion of the outlet ports 938'. Fluid flow exerts a force on a surface 952 opposite the side 920' to at least partially compensate and balance the localized fluid flow force at the side 920' of the slider 912'.

In accordance with the provisions of the patent statutes, the principle and mode of operation of this invention have been explained and illustrated in its preferred embodiment. Although the invention has been described with respect to the specific embodiments discussed above, one skilled in the art will appreciate that other embodiments are possible without departing from the spirit and scope of the invention. For example, while the third and fourth embodiments have been described as utilizing proportionally controlled microvalves, non-proportionally controlled microvalves may be used with an ECU configured to control such microvalves.

What is claimed is:

1. A hydraulic braking system for a wheeled vehicle, comprising:
    a braking device adapted to provide a braking force to at least one wheel for braking the vehicle;
    at least one main hydraulic conduit extending from a source of pressurized brake fluid to said braking device, said source and said main hydraulic conduit cooperating to supply pressurized fluid to said braking device; and
    at least one microvalve disposed in said main hydraulic conduit between said source and said braking device, said at least one microvalve being a micro-machined plate valve having a body including a plurality of plates defining a plurality of parallel planes, a port through at least one of said plates through which the pressurized fluid may flow, and a movable valve element selectively movable within a plane parallel to said plurality of parallel planes to cover and uncover said port, said at least one microvalve thereby selectively controlling the pressurized fluid to said braking device.

2. The hydraulic braking system defined in claim 1 wherein said at least one microvalve has at least three operating states, said operating states including an open state, a flow restricted state, and a closed state.

3. The hydraulic braking system defined in claim 2 wherein said flow restricted state is variable.

4. The hydraulic braking system defined in claim 3 wherein said at least one microvalve has a micro-machined valve actuator.

5. The hydraulic braking system defined in claim 1 wherein said at least one microvalve is an apply microvalve disposed on said main hydraulic conduit for controlling the supply of the pressurized brake fluid from said master cylinder to said braking device, the hydraulic braking system further including a dump microvalve disposed on said main hydraulic conduit between said apply microvalve and said braking device for relieving the pressure of the brake fluid at said braking device.

6. The hydraulic braking system defined in claim 5 further including a wheel speed sensor and an electronic control unit adapted to generate one or more electrical output signals in response to a plurality of electrical input signals, said electronic control unit receiving separate input signals which are representative of an amount of brake force demand and wheel speed and said electronic control unit sending an output signal to each of said apply microvalve and said dump microvalve to selectively control the pressurized brake fluid supplied to said braking device for effective said braking force.

7. A hydraulic braking system for a wheeled vehicle, comprising:
    a braking device adapted to provide a braking force to at least one wheel for braking the vehicle;
    at least one main hydraulic conduit extending from a source of pressurized brake fluid to said braking device, said source and said main hydraulic conduit cooperating to supply pressurized fluid to said braking device; and
    at least one microvalve disposed in said main hydraulic conduit between said source and said braking device, said at least one microvalve having a body including a plurality of plates defining a plurality of parallel planes, and a slider selectively movable in a plane parallel to said plurality of parallel planes for controlling the pressurized fluid to said braking device, said at least one microvalve has at least three operating states, said operating states including an open state, a selectively variable flow restricted state, and a closed state, said at least one microvalve being adapted for indefinite operation in any of these operating states.

8. The hydraulic braking system defined in claim 7 wherein said at least one microvalve provides proportional control between a first fluid path and a second fluid path and said three operating states includes a fully open state to said first fluid path with a fully closed state to a second fluid path, a variable flow restricted state to said first path and said second fluid path, and a fully closed state to said first fluid path with a fully open state to said second fluid path.

9. The hydraulic braking system defined in claim 7 wherein said at least one microvalve is an apply microvalve disposed on said main hydraulic conduit for controlling the supply of the pressurized brake fluid from said source of pressurized brake fluid to said braking device, the hydraulic braking system further including a dump microvalve disposed on said main hydraulic conduit between said apply microvalve and said braking device for relieving the pressure of the brake fluid at said braking device.

10. The hydraulic braking system defined in claim 9 further including a wheel speed sensor and an electronic control unit adapted to generate one or more electrical output signals in response to a plurality of electrical input signals, said electronic control unit receiving separate input signals which are representative of an amount of brake force demand and wheel speed and said electronic control unit sending an output signal to each of said apply microvalve and said dump microvalve to selectively control the pressurized brake fluid supplied to said braking device for effecting said braking force.

11. An braking system for a motor vehicle with wheels, comprising:
   a braking device adapted to provide a braking force to at least one wheel for braking the vehicle;
   a source of pressurized brake fluid to said braking device;
   a hydraulic conduit in fluid communication with said braking device and said source, said source and said hydraulic conduit cooperating to supply pressurized fluid to said braking device;
   at least one microvalve device disposed in said hydraulic conduit between said source and said braking device, said at least one microvalve device including an micro-machined electrically operated control microvalve having a body including a plurality of plates defining a plurality of parallel planes, a port forming a portion of said hydraulic conduit for the pressurized fluid, and a slider selectively movable within a plane parallel to said plurality of parallel planes to cover and uncover said port, said microvalve device selectively controlling the pressurized fluid to said braking device through movement of said slider to selectively cover and uncover said port; and
   an Electronic Control Unit controlling operation of said control microvalve.

12. The braking system defined in claim 11, further comprising:
   a brake pedal;
   a master cylinder operatively connected to be operated by said brake pedal;
   a second hydraulic conduit in fluid communication with said master cylinder;
   a pedal simulator connected via said second hydraulic conduit to be in fluid communication with said master cylinder; and
   a brake demand sensor adapted to sense a parameter indicative of a driver's brake demand through operation of said brake pedal and generate a corresponding brake demand signal to said Electronic Control Unit.

13. The braking system defined in claim 12 wherein said source of pressurized brake fluid comprises an electric motor-driven pump operating under the control of said Electronic Control Unit.

14. The braking system defined in claim 13, further comprising:
   a micro-machined pedal simulator isolation valve disposed in said second hydraulic conduit which is selectively operable by said Electronic Control Unit to a position permitting fluid communication between said master cylinder and said pedal simulator and to a position preventing fluid communication between said master cylinder and said pedal simulator;
   a third hydraulic conduit connecting said master cylinder to said braking device; and
   a micro-machined isolation valve disposed in said third hydraulic conduit fluid which is selectively operable by said Electronic Control Unit to a position permitting fluid communication between said master cylinder and said braking device and to a position preventing fluid communication between said master cylinder and said braking device.

15. The braking system defined in claim 14 wherein said control microvalve, said micro-machined pedal simulator isolation valve, and said micro-machined isolation valve are fabricated on one silicon chip.

16. The braking system defined in claim 12 wherein said sensor is a micro-machined pressure transducer sensing pressure in said pedal simulator.

17. The braking system defined in claim 14 wherein said sensor is a micro-machined pressure transducer sensing pressure in said pedal simulator fabricated on one silicon chip with one of said control microvalve, said micro-machined pedal simulator isolation valve, and said micro-machined isolation valve.

18. A hydraulic braking system for a wheeled vehicle, comprising:
   a braking device adapted to provide a braking force to at least one wheel for braking the vehicle; and
   a microvalve having a body including a plurality of plates defining a plurality of parallel planes, a first port and a second port being formed through at least one of said plurality of plates, said first port being in communication with said braking device, said second port being in fluid communication with a source of pressurized brake fluid, and a movable valve element selectively movable within a plane parallel to said plurality of parallel planes to cover and uncover at least one of said first port and said second port, said microvalve thereby selectively controlling the pressurized fluid to said braking device.

* * * * *